United States Patent
Shinozaki et al.

(10) Patent No.: US 9,667,863 B2
(45) Date of Patent: May 30, 2017

(54) IMAGE PROCESSING SYSTEM, IMAGE PROCESSING METHOD, AND PROGRAM

(71) Applicant: Sony Corporation, Tokyo (JP)

(72) Inventors: Hirotaka Shinozaki, Tokyo (JP); Shinichi Yoshimura, Tokyo (JP); Shuichi Konami, Chiba (JP); Mayuko Maruyama, Tokyo (JP); Masayuki Tachi, Tokyo (JP); Mitsuharu Ohki, Tokyo (JP); Hideshi Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/760,323

(22) PCT Filed: Feb. 7, 2014

(86) PCT No.: PCT/JP2014/000677
§ 371 (c)(1),
(2) Date: Jul. 10, 2015

(87) PCT Pub. No.: WO2014/129141
PCT Pub. Date: Aug. 28, 2014

(65) Prior Publication Data
US 2015/0365593 A1  Dec. 17, 2015

(30) Foreign Application Priority Data

Feb. 20, 2013  (JP) .................... 2013-031376

(51) Int. Cl.
*H04N 5/232*  (2006.01)
*H04N 5/225*  (2006.01)
(Continued)

(52) U.S. Cl.
CPC ......... *H04N 5/23229* (2013.01); *G06F 3/013* (2013.01); *G06T 5/003* (2013.01);
(Continued)

(58) Field of Classification Search
CPC .. H04N 5/23229; H04N 5/247; H04N 5/2252; H04N 5/2258; H04N 5/23264;
(Continued)

(56) References Cited

U.S. PATENT DOCUMENTS 9,253,434 B2 *  2/2016  Boss .................. H04N 5/23229
9,307,151 B2 *  4/2016  Son .................... H04N 5/23293
(Continued)

FOREIGN PATENT DOCUMENTS

EP    2 525 271 A2   11/2012
JP    05-158133 A     6/1993
(Continued)

OTHER PUBLICATIONS

International Search Report; International Application No. PCT/JP2014/000677; Filed: Feb. 7, 2014. (Form PCT/ISA/210).
(Continued)

*Primary Examiner* — Hung Lam
(74) *Attorney, Agent, or Firm* — Michael Best & Friedrich LLP

(57) ABSTRACT

An information processing system that acquires first image data captured by a first camera unit disposed on a first side of a housing; acquires second image data captured by a second camera unit disposed on a second side of the housing, which is opposite to the first side of the housing; and modifies the second image data based on the first image data.

21 Claims, 24 Drawing Sheets

(51) Int. Cl.
  G06T 5/00      (2006.01)
  G06F 3/01      (2006.01)
  G06T 7/20      (2017.01)
  H04N 5/247     (2006.01)
  G03B 15/03     (2006.01)

(52) U.S. Cl.
  CPC ............. *G06T 7/20* (2013.01); *H04N 5/2252* (2013.01); *H04N 5/2258* (2013.01); *H04N 5/2259* (2013.01); *H04N 5/23216* (2013.01); *H04N 5/23219* (2013.01); *H04N 5/23254* (2013.01); *H04N 5/23264* (2013.01); *H04N 5/23296* (2013.01); *H04N 5/247* (2013.01); *G03B 15/03* (2013.01); *G03B 2213/025* (2013.01); *G06T 2200/28* (2013.01); *G06T 2207/10004* (2013.01); *G06T 2207/10016* (2013.01); *G06T 2207/20201* (2013.01)

(58) Field of Classification Search
  CPC ........... H04N 5/23254; H04N 5/23219; H04N 5/2259; H04N 5/23216; H04N 5/23296; G06F 3/013; G06T 7/20; G06T 5/003; G06T 2200/28
  See application file for complete search history.

(56) References Cited

U.S. PATENT DOCUMENTS

| | | | |
|---|---|---|---|
| 9,313,409 B2 * | 4/2016 | Kim | H04N 5/2628 |
| 9,349,414 B1 * | 5/2016 | Furment | H04N 5/23216 |
| 9,363,433 B2 * | 6/2016 | Baek | H04N 5/2258 |
| 2008/0004073 A1 | 1/2008 | John et al. | |
| 2009/0128647 A1 | 5/2009 | Fahn et al. | |
| 2010/0295971 A1 | 11/2010 | Zhu | |
| 2012/0002063 A1 | 1/2012 | Lee et al. | |
| 2012/0120186 A1 | 5/2012 | Diaz et al. | |
| 2012/0236164 A1 * | 9/2012 | Nakano | H04N 5/23219 348/208.1 |
| 2014/0152877 A1 * | 6/2014 | Honsho | G03B 15/00 348/239 |

FOREIGN PATENT DOCUMENTS

| | | |
|---|---|---|
| JP | 2006-025167 A | 1/2006 |
| JP | 2010-011253 A | 1/2010 |
| JP | 2010-171564 A | 8/2010 |
| WO | WO-2008/040575 A1 | 4/2008 |
| WO | WO-2012/138355 A1 | 10/2012 |

OTHER PUBLICATIONS

PCT Written Opinion of the International Searching Authority; International Application No. PCT/JP2014/000677; Date of Opinion: Jun. 27, 2014. (Form PCT/ISA/220 and PCT/ISA/237).

European Communication Pursuant to Article 94(3) EPC issued on Apr. 18, 2017 for corresponding European Application No. 14713931.5.

* cited by examiner

FIG. 7
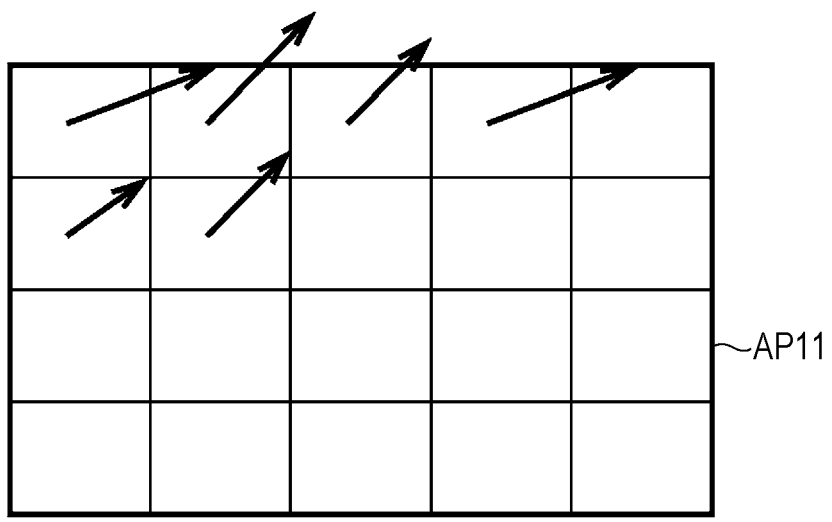
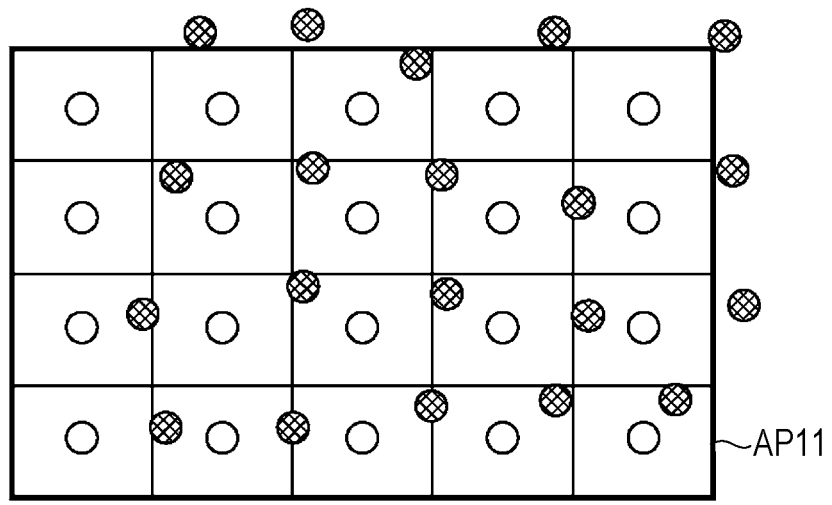

FIG. 13
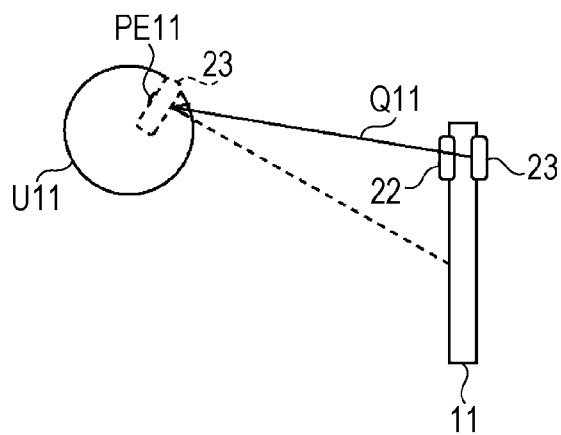
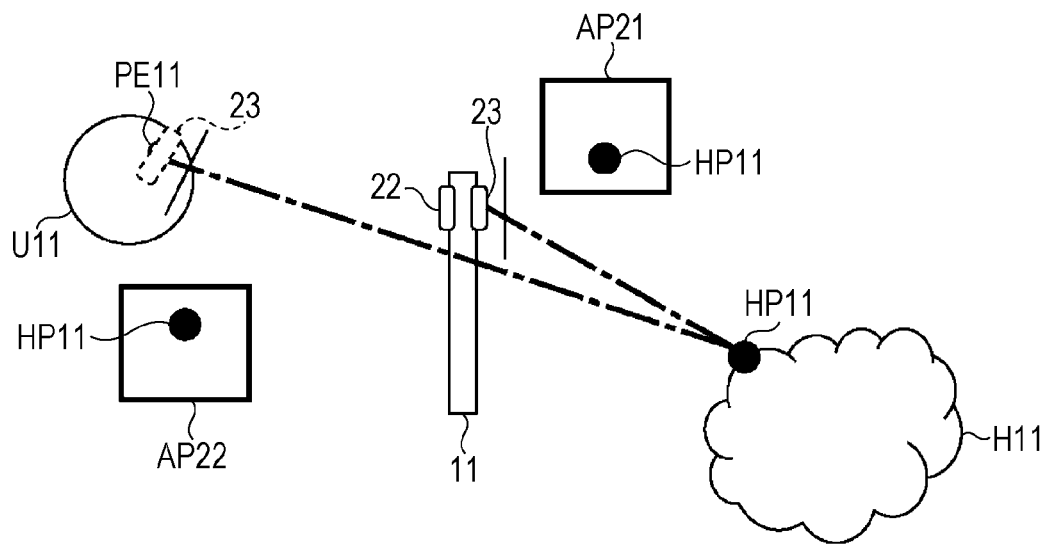

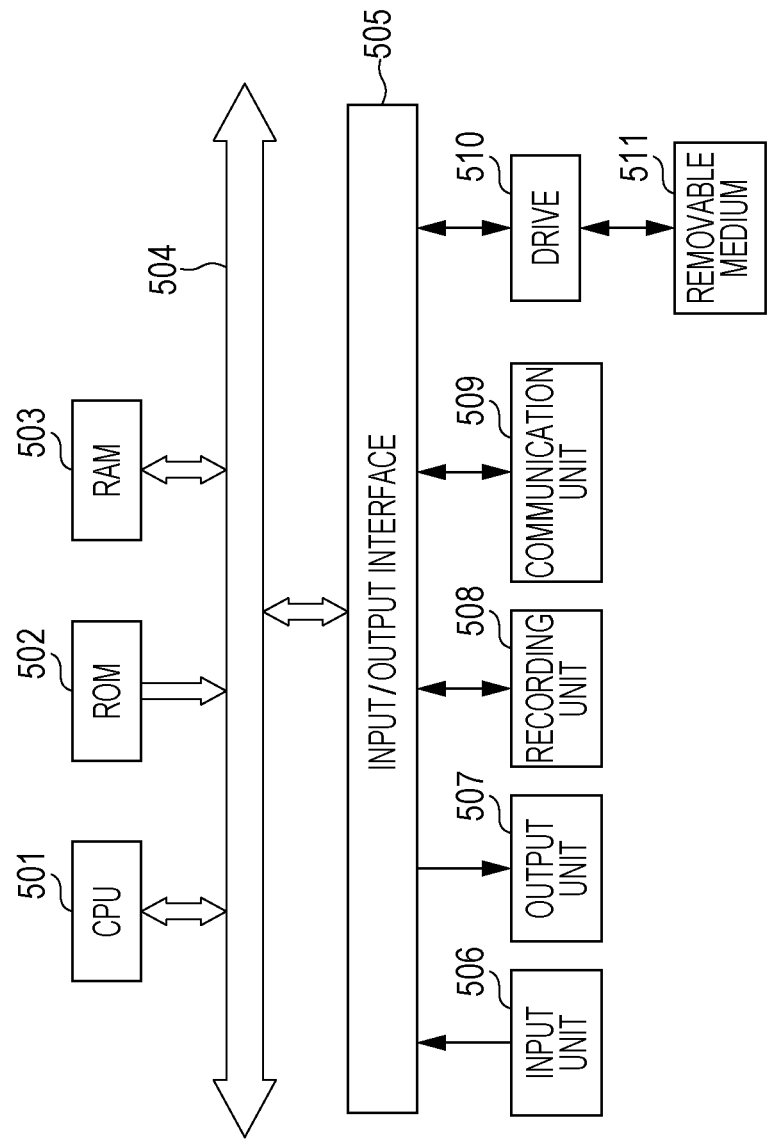

US 9,667,863 B2

IMAGE PROCESSING SYSTEM, IMAGE PROCESSING METHOD, AND PROGRAM

CROSS REFERENCE TO RELATED APPLICATIONS

This application claims the benefit of Japanese Priority Patent Application JP 2013-031376 filed Feb. 20, 2013, the entire contents of which are incorporated herein by reference.

TECHNICAL FIELD

The present technology relates to an image processing device, a photographing control method, and a program, and more particularly, an image processing device, a photographing control method, and a program capable of obtaining a higher-quality image.

BACKGROUND ART

In the past, imaging devices on which two cameras are mounted have been known. Some of the imaging devices can simultaneously photograph images with two cameras.

For example, as the imaging devices, imaging devices have been suggested which performs control such that imaging is configured to be performed with a main camera when a subject is attempted to be imaged with the main camera and an expression of a photographer imaged with a sub-camera is changed (for example, see PTL 1).

CITATION LIST

Patent Literature

[PTL 1]
Japanese Unexamined Patent Application Publication No. 2010-11253

SUMMARY

Technical Problem

However, in the above-described technology, a photographing timing is controlled by the main camera based on an image obtained with the sub-camera. Thus, a higher-quality image such as an image having higher sharpness or an image closer to a point of sight of the photographer may not be obtained.

It is desirable to provide a technology capable of a higher-quality image.

Solution to Problem

According to one aspect, the disclosure is directed to an information processing system including circuitry configured to acquire first image data captured by a first camera unit disposed on a first side of a housing; acquire second image data captured by a second camera unit disposed on a second side of the housing, which is opposite to the first side of the housing; and modify the second image data based on the first image data.

The first image data may be captured by the first camera unit at substantially the same time as the second image data is captured by the second camera unit.

The circuitry may be configured to modify the second image data by performing blur correction on the second image data based on the first image data.

The circuitry may be configured to: generate first motion information based on the first image data; generate second motion information based on the second image data; and modify the second image data by performing blur correction on the second image data based on the first motion information and the second motion information.

The circuitry may be configured to modify the second image data by controlling an image capture angle corresponding to the second image data based on the first image data.

The circuitry maybe configured to control the image capture angle corresponding to the second image data by at least one of changing a zoom ratio of the second camera unit, changing a diaphragm of the second camera unit, changing an orientation of the second camera unit, and performing image deformation of the second image data.

The circuitry maybe configured to: output the second image data to a display; detect a gaze position of a user on the display based on the first image data; and modify the second image data by controlling an image capture parameter of the second camera unit based on the detected gaze position of the user on the display.

The circuitry may be configured modify the second image data by synthesizing the first image data and the second image data.

The circuitry maybe configured to: obtain a first white balance value corresponding to the first image data; obtain a second white balance value corresponding to the second image data; and control a light source to emit light based on the first white balance value and the second white balance value.

The circuitry may be configured to: acquire third image data captured by the first camera unit while the light source is emitting light; and modify the second image data by synthesizing the third image data and the second image data.

According to another aspect, the disclosure is directed to an information processing method including: acquiring first image data captured by a first camera unit disposed on a first side of a housing; acquiring second image data captured by a second camera unit disposed on a second side of the housing, which is opposite to the first side of the housing; and modifying the second image data based on the first image data.

According to another aspect, the disclosure is directed to a non-transitory computer-readable medium including computer-program instructions, which when executed by an information processing system, cause the system to: acquire first image data captured by a first camera unit disposed on a first side of a housing; acquire second image data captured by a second camera unit disposed on a second side of the housing, which is opposite to the first side of the housing; and modify the second image data based on the first image data.

Advantageous Effects of Invention

According to an embodiment of the present technology, it is possible to obtain a higher-quality image.

BRIEF DESCRIPTION OF DRAWINGS

FIG. 7 is a diagram for describing a camera blur correction.

FIG. 13 is a diagram for describing field angle adjustment.

FIG. 24 is a diagram illustrating a configuration example of a computer.

DESCRIPTION OF EMBODIMENTS

Hereinafter, embodiments to which the present technology is applied will be described with reference to the drawings.

First Embodiment

Overview of Embodiments of Present Technology

An embodiment of the present technology relates to devices including a plurality of imaging units, such as a multi-function type mobile phone or a digital camera, which can photograph images in mutually different directions and performing photographing control based on information obtained from an image photographed by another imaging unit when a main imaging unit photographs an image.

The photographing control performed here is control for adjustment relevant to an image to be photographed, for example, driving control of an imaging unit such as image view adjustment or illumination of a subject or image quality adjustment of an image such as camera blur correction or white balance adjustment. The photographing control is assumed to include control of image processing performed up to recording of an image after photographing of the image to obtain a final image for recording. In embodiments of the present technology, a higher-quality image can be obtained by performing such photographing control.

Figure 1:
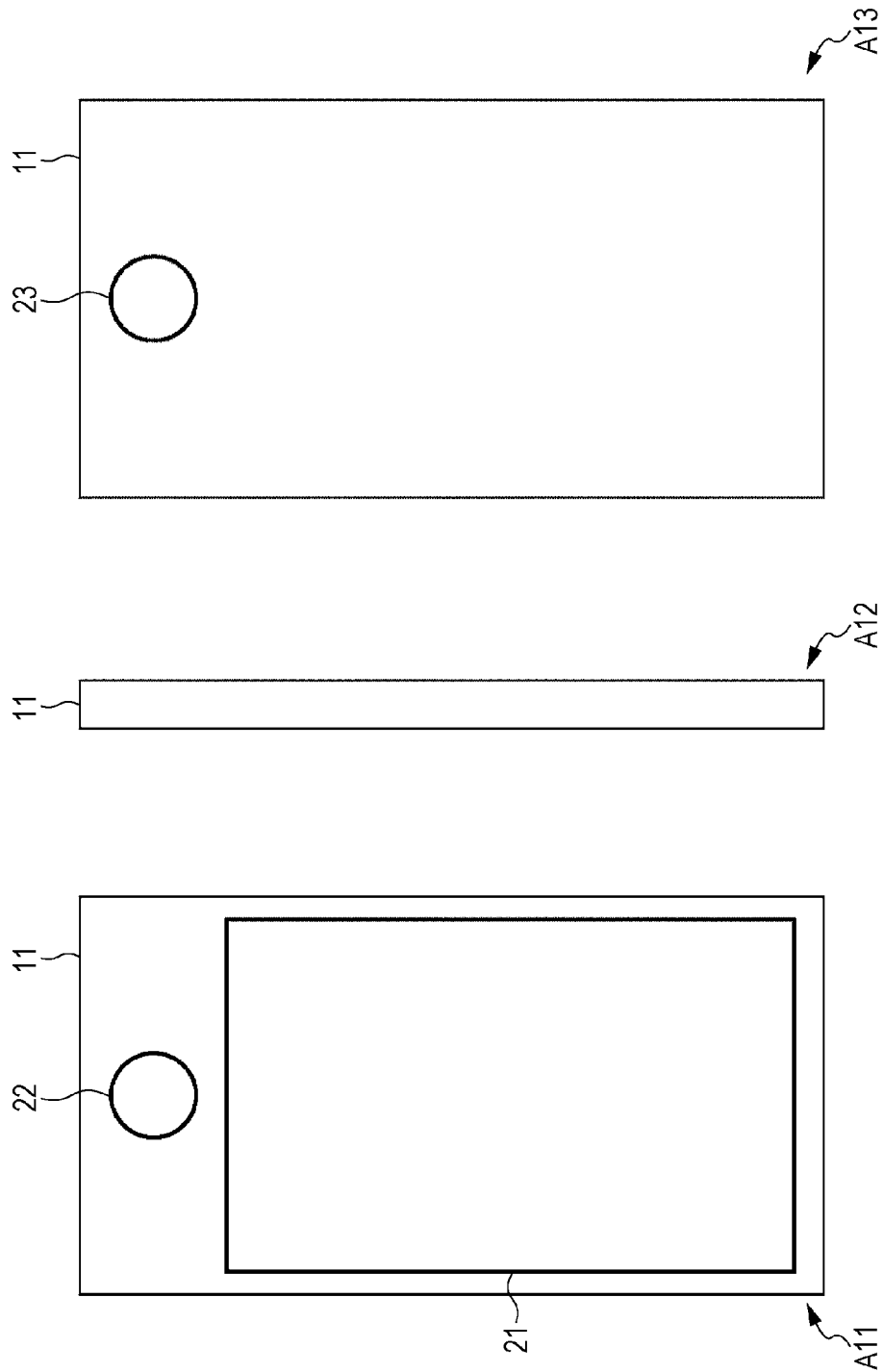
FIG. 1 is a diagram illustrating a configuration example of the outer appearance of an image processing device.

FIG. 1 is a diagram illustrating a configuration example of the outer appearance of an image processing device such as a multi-function mobile phone to which an embodiment of the present technology is applied.

In FIG. 1, the outer appearance of an image processing device 11 indicated by an arrow A11 is a front surface side, that is, an outer appearance side viewed from a user when the user holds the image processing device 11 to perform an operation. The outer appearance of the image processing device 11 indicated by an arrow A12 is a side surface side, that is, an outer appearance side when viewed from the left side or the right side of the image processing device 11 indicated by the arrow A11 in the drawing. The outer appearance of the image processing device 11 indicated by an arrow A13 is a rear surface side, that is, an outer appearance of an opposite surface side to the front surface side.

As indicated by the arrow A11, a display unit 21 that displays an image or the like is installed on the front surface side of the image processing device 11. A touch panel used for the user to perform an input operation is installed to be superimposed on the display unit 21. In the drawing of the display unit 21 on the front surface of the image processing device 11, an in-image capturing unit 22 that photographs a subject present in the direction of the front surface side of the image processing device 11 is also installed on the upper side. Accordingly, an image photographed by the in-image capturing unit 22 is an image of the user operating the image processing device 11 in most cases. Hereinafter, an image photographed by the in-image capturing unit 22 is referred to as an in-image. The description will be continued assuming that an image of a user is photographed as the in-image.

As indicated by the arrow A13, an out-image capturing unit 23 that photographs a subject present in the direction of the rear surface side of the image processing device 11 is installed on the rear surface of the image processing device 11. In this example, the out-image capturing unit 23 is installed to photograph an image in an opposite direction to the photographing direction of the in-image capturing unit 22. However, the in-image capturing unit 22 and the out-image capturing unit 23 may be disposed such that photographing directions are different from each other.

An image photographed by the out-image capturing unit 23 is normally an image of a landscape, a human, or the like viewed by the user, that is, an image of a subject which the user considers desirable to photograph. Hereinafter, an image photographed by the out-image capturing unit 23 is referred to as an out-image.

The image processing device 11 photographs an in-image together with an out-image at the time of photography of the out-image and performs photographing control to obtain the out-image with higher sharpness by removing a camera shake component of the out-image using the in-image. That is, camera blur correction is performed as the photographing control of the out-image. In this embodiment, moving images are assumed to be photographed as the out-image and the in-image.

Configuration Example 1 of Image Processing Device

Next, a more detailed configuration of the image processing device 11 will be described.

Figure 2:
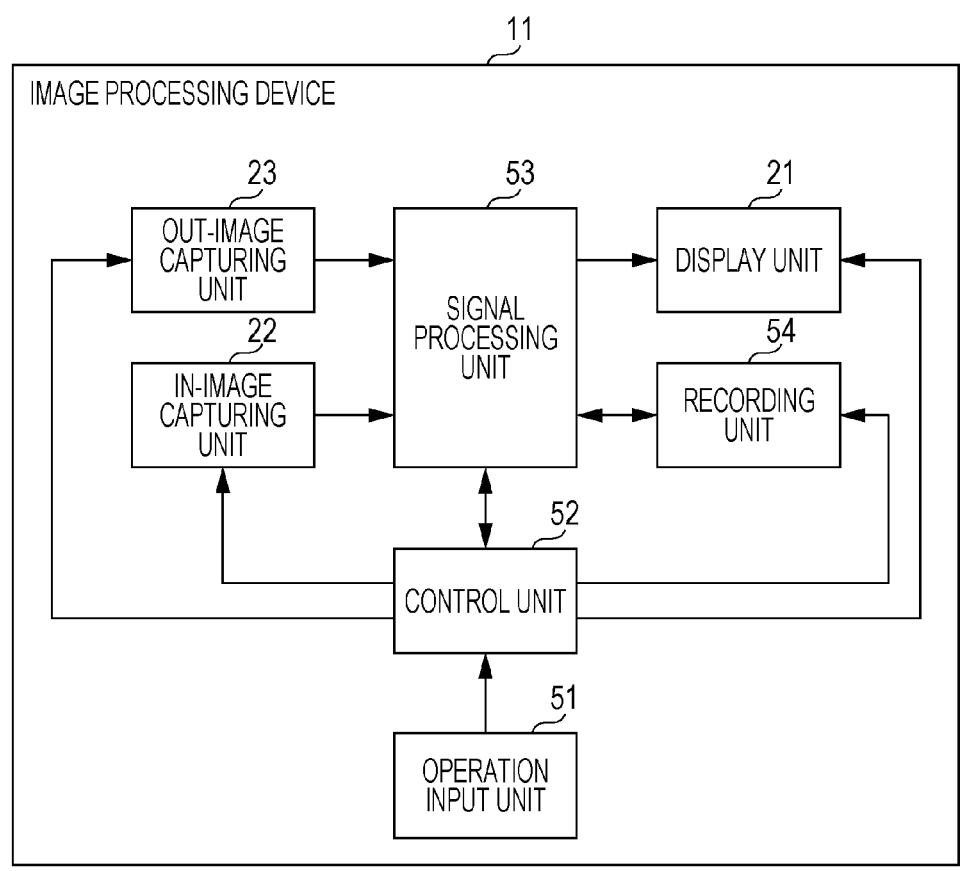
FIG. 2 is a diagram illustrating a configuration example of the image processing device.

FIG. 2 is a block diagram illustrating a more detailed configuration example of the image processing device 11. In FIG. 2, the same reference numerals are given to constituent elements corresponding to the constituent elements in FIG. 1 and the description thereof will be appropriately omitted.

The image processing device 11 illustrated in FIG. 2 includes the display unit 21, the in-image capturing unit 22, the out-image capturing unit 23, an operation input unit 51, a control unit 52, a signal processing unit 53, and a recording unit 54.

For example, the operation input unit 51 is formed by the touch panel superimposed on the display unit 21 and supplies a signal according to a user's operation to the control unit 52.

The control unit 52 controls a process of the entire image processing device 11 according to the signal supplied from the operation input unit 51. For example, the control unit 52 instructs the in-image capturing unit 22 or the out-image capturing unit 23 to photograph an image or instructs the signal processing unit 53 to perform various kinds of image processing on the out-image. The control unit 52 instructs the display unit 21 to display an image or instructs the recording unit 54 to record an image.

The signal processing unit 53 performs camera blur correction on the out-image based on the out-image supplied from the out-image capturing unit 23 and the in-image supplied from the in-image capturing unit 22 and supplies the out-image obtained as the result of the image processing to the recording unit 54 to record the out-image. The signal processing unit 53 reads the out-image from the recording unit 54 and supplies the out-image to the display unit 21 to display the out-image.

The recording unit 54 records the out-image supplied from the signal processing unit 53 and supplies the out-image recorded as necessary to the signal processing unit 53.

Configuration Example 1 of Signal Processing Unit

Figure 3:
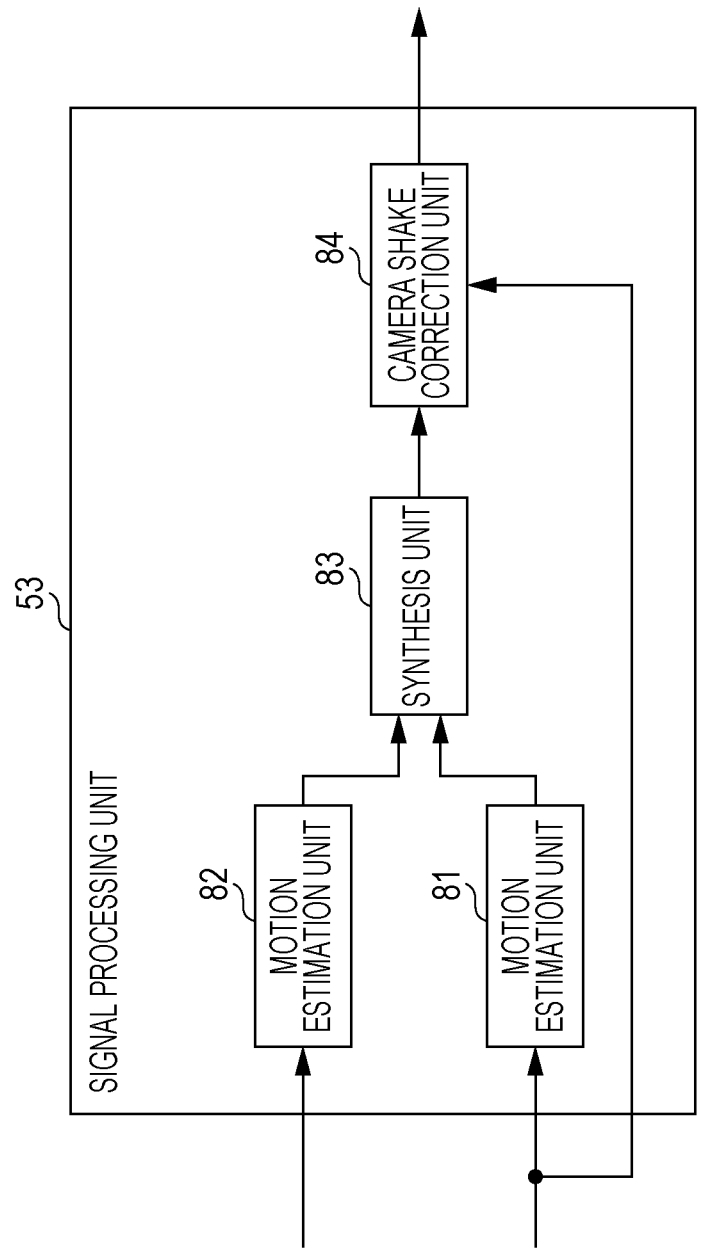
FIG. 3 is a diagram illustrating a configuration example of a signal processing unit.

More specifically, the signal processing unit 53 in FIG. 2 is configured as in FIG. 3.

The signal processing unit 53 illustrated in FIG. 3 includes a motion estimation unit 81, a motion estimation unit 82, a synthesis unit 83, and a camera blur correction unit 84.

The motion estimation unit 81 generates motion information indicating a motion of the image processing device 11 at the time of the photography of the out-image by performing motion estimation on the out-image supplied from the out-image capturing unit 23 and supplies the generated motion information to the synthesis unit 83.

The motion estimation unit 82 generates motion information indicating a motion of the image processing device 11 at the time of photography of the in-image by performing motion estimation on the in-image supplied from the in-image capturing unit 22 and supplies the generated motion information to the synthesis unit 83. The in-image is simultaneously photographed with the out-image.

The synthesis unit 83 obtains motion information indicating the final motion of the image processing device 11 at the time of the photography of the out-image by synthesizing the motion information supplied from the motion estimation unit 81 and the motion information supplied from the motion estimation unit 82 and supplies the obtained motion information to the camera blur correction unit 84.

The camera blur correction unit 84 performs camera blur correction on the out-image supplied from the out-image capturing unit 23 based on the motion information supplied from the synthesis unit 83 and supplies the out-image acquired as the result to the recording unit 54.

[Description 1 of Photographing Process]

Here, when the user operates the operation input unit 51, a mode for performing the camera blur correction of the out-image is selected, and an instruction to photograph the out-image is given by simultaneous photography of the out-image and the in-image, the image processing device 11 performs a photographing process to photograph the out-image. Hereinafter, the photographing process performed by the image processing device 11 will be described with reference to the flowchart of FIG. 4.

In step S11, the out-image capturing unit 23 photographs an out-image in response to an instruction of the control unit 52 and supplies the out-image to the motion estimation unit 81 and the camera blur correction unit 84. For example, a moving image such as a landscape image is photographed as the out-image. At the time of the photography of the out-image, the signal processing unit 53 supplies the out-image supplied from the out-image capturing unit 23 to the display unit 21 so that the out-image is displayed. Thus, the user can perform the photographing while confirming the out-image on the display unit 21, as necessary.

In step S12, the in-image capturing unit 22 photographs an in-image in response to an instruction of the control unit 52 and supplies the in-image to the motion estimation unit 82. For example, a moving image of the face of the user operating the image processing device 11 is photographed as the in-image.

In step S13, the motion estimation unit 81 generates motion information of the image processing device 11 by performing the motion estimation on the out-image supplied from the out-image capturing unit 23 and supplies the motion information to the synthesis unit 83.

In step S14, the motion estimation unit 82 generates motion information of the image processing device 11 by performing the motion estimation on the in-image supplied from the in-image capturing unit 22 and supplies the motion information to the synthesis unit 83.

In step S15, the synthesis unit 83 synthesizes the motion information supplied from the motion estimation unit 81 and the motion information supplied from the motion estimation unit 82 and supplies the synthesized motion information to the camera blur correction unit 84.

Specifically, for example, the following processes are performed in step S13 to step S15 described above.

Figure 5:
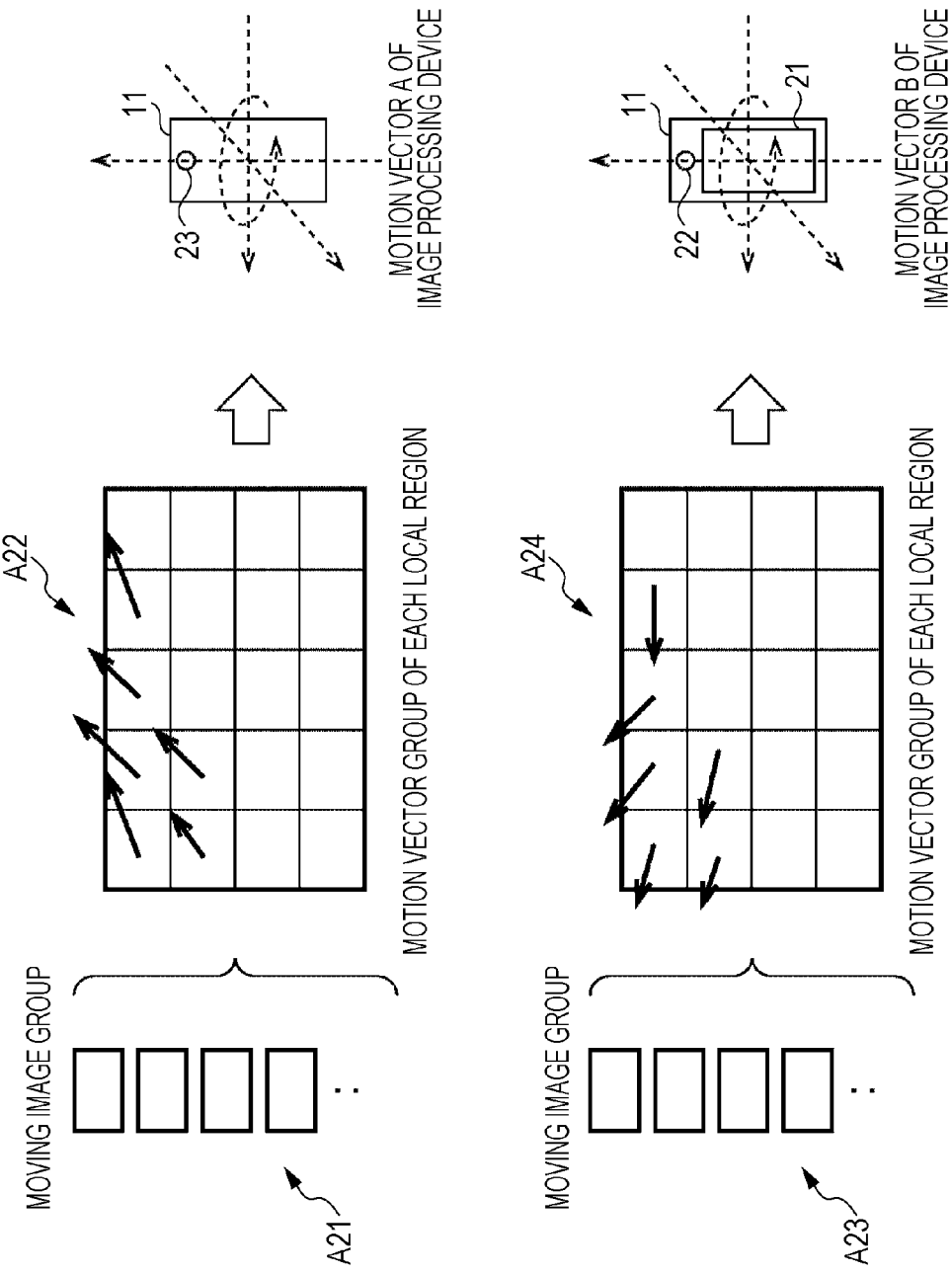
FIG. 5 is a diagram for describing motion information.

That is, as indicated by an arrow A21 of FIG. 5, a group of a plurality of images, that is, a moving image including images of respective frames can be assumed to be obtained as an out-image. Here, each rectangle indicated by the arrow A21 represents each frame of the out-image.

When the out-image including the plurality of frames is obtained, the motion estimation unit 81 divides the out-image into a plurality of local regions and obtains a motion vector of each local region, as indicated by an arrow A22. One rectangle indicated by the arrow A22 represents an out-image and each rectangle in the out-image represents the local region on the out-image. Further, an arrow drawn in each local region indicates a motion vector of the local region.

In the calculation of the motion vector of the local region, for example, a method of obtaining an amount of movement of a subject by similarity between images at respective times (frames), for example, a template matching method, is used. Thus, when the motion vector is obtained for each local region of the out-image, the motion estimation unit 81 calculates motion vector A of the image processing device 11 as motion information based on the motion vector of each local region of the out-image at each time.

For example, motion vector A of the image processing device 11 is calculated according to a method such as affine parameter estimation by a Newton method.

As in the case of the out-image, the motion information based on the in-image is also calculated. That is, when a group of images indicated by an arrow A23 is obtained as an in-image, the motion estimation unit 82 divides the in-image into a plurality of local regions, as indicated by an arrow A24, and obtains a motion vector of each local region by template matching or the like.

Each rectangle indicated by the arrow A23 represents each frame of the in-image. One rectangle indicated by the arrow A24 represents an in-image and each rectangle in the in-image represents the local region on the in-image. Further, an arrow drawn in each local region indicates a motion vector of the local region.

The motion estimation unit 82 calculates motion vector B of the image processing device 11 as motion information by a Newton method or the like based on the motion vector of each local region of the in-image at each time.

Figure 6:
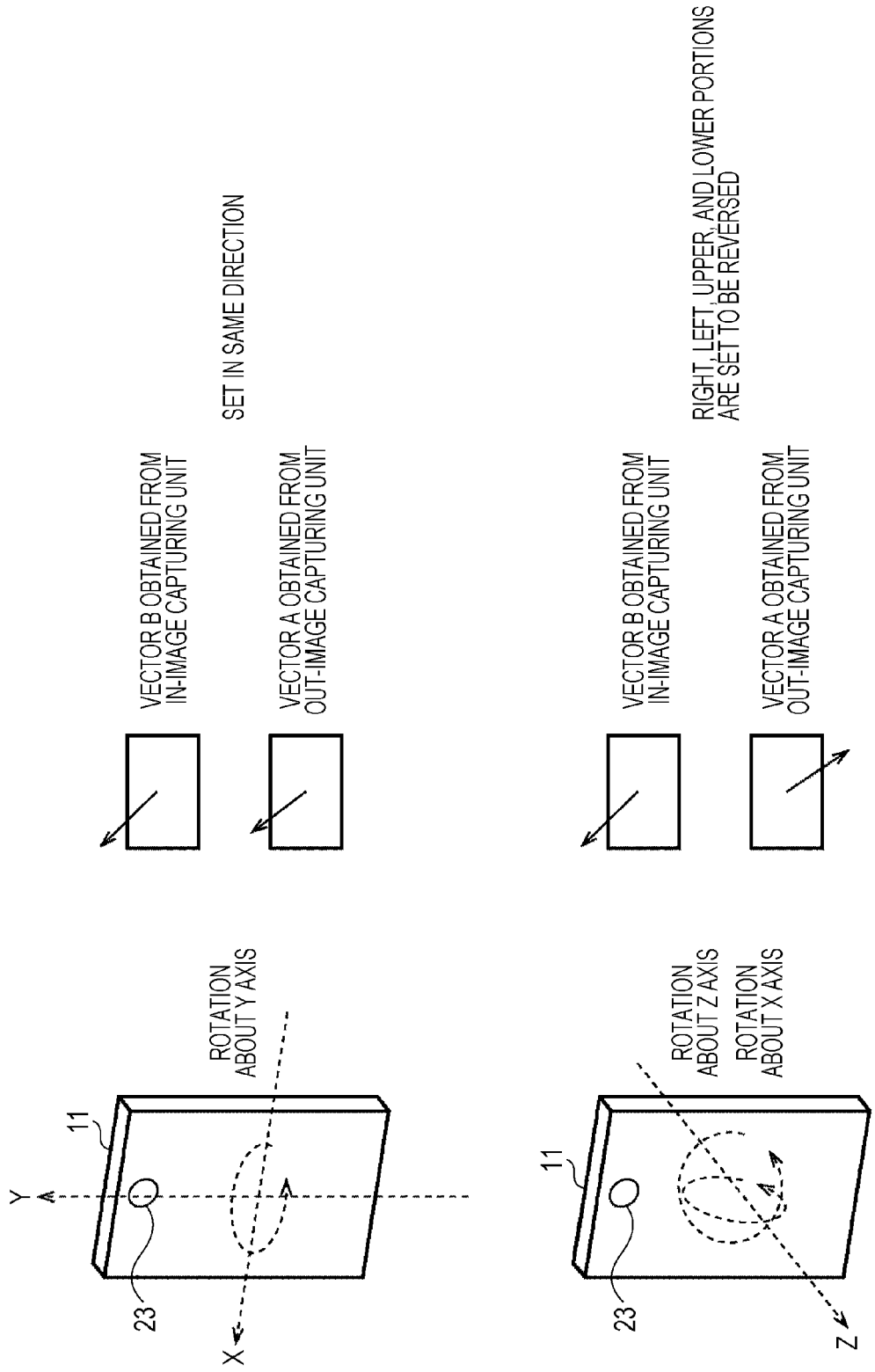
FIG. 6 is a diagram for describing the motion information.

The right, left, upper, and lower portions of motion vector B obtained from the in-image in this way are reversed with respect to motion vector A obtained from the out-image, as illustrated in FIG. 6.

That is, as illustrated in FIG. 6, a direction perpendicular to the front surface of the image processing device 11, that is, a direction parallel to the photographing direction of the out-image capturing unit 23 is referred to as a Z axis direction and axes perpendicular to the Z axis are referred to as an X axis and a Y axis. Here, the X axis is an axis in the horizontal direction of the image processing device 11, that is, the direction parallel to the horizon plane and the Y axis is an axis in the direction parallel to the vertical direction.

When motion vector A and motion vector B are calculated using the out-image and the in-image, respectively, and for example, a motion of the image processing device 11 is only a rotation motion around the Y axis serving as a rotation axis, as illustrated in the upper side of the drawing, motion vector A and motion vector B are in the same direction.

On the other hand, when the motion of the image processing device 11 is only a rotation motion around the X axis serving as a rotation axis and a rotation motion around the Z axis serving as a rotation axis, as illustrated in the lower side of the drawing, the right, left, upper, and lower portions of motion vector A and motion vector B are reversed so that the directions thereof are reversed to be opposite directions.

One rectangle in the right side of the drawing represents the out-image or the in-image and an arrow in the image represents a motion vector of the image.

When motion vector A and motion vector B are obtained as the motion information in this way, the synthesis unit 83 synthesizes motion vector A and motion vector B to generate motion vector C. The obtained motion vector C is assumed to be the final motion information of the image processing device 11.

Specifically, for example, the synthesis unit 83 calculates the motion vector C by calculating the following Expression (1).

[Math. 1]

$$C = a1 \cdot A + b1 \cdot B \quad (1)$$

In Expression (1), a1 and b1 indicate coefficients which are weights for motion vector A and motion vector B, respectively, and are determined so that "a1+b1=1.0" is satisfied.

For example, the out-image capturing unit 23 and the in-image capturing unit 22 may perform the photographing so that exposure times differ and a larger weight may be given to a motion vector obtained from an image for which the exposure time is shorter, so that the coefficients a1 and b1 are determined according to the accuracy of the motion estimation. Here, the reason why the larger weight is given to the motion vector obtained from the image for which the exposure time is shorter is that the image for which the exposure time is shorter at the time of the photography of the image has less blurring caused due to a moving subject or camera shake and the motion estimation can be performed accurately.

In particular, of the out-image capturing unit 23 and the in-image capturing unit 22, a distance up to a subject is shorter for the in-image capturing unit 22 photographing a user who is a photographer in many cases. Therefore, blurring (shake) caused due to camera shake is less in the in-image than in the out-image and the motion estimation can be performed with higher accuracy. Accordingly, more effectiveness can be acquired when the exposure time of the in-image is set to be shorter than the exposure time of the out-image and the coefficient b1 is set to have a larger value than the coefficient a1.

Referring back to the flowchart of FIG. 4 to make the description, when the motion information of the image processing device 11 is calculated as the control information for camera blur correction in the process of step S15, the process of step S16 is subsequently performed.

In step S16, the camera blur correction unit 84 performs the camera blur correction on the out-image supplied from the out-image capturing unit 23 based on the motion information supplied from the synthesis unit 83 and supplies the out-image obtained as the result to the recording unit 54.

For example, the camera blur correction unit 84 calculates an amount of movement of a feature point inside each local region on the out-image based on the motion vector C which is the motion information supplied from the synthesis unit 83 and calculates an affine parameter based on the amount of movement.

More specifically, as illustrated in the upper side of FIG. 7, a motion vector of each local region is assumed to be obtained as motion information of the image processing device 11 in an out-image AP11 at a time t (frame t). Each rectangle in the out-image AP11 represents the local region and an arrow in each local region represents a motion vector of the local region.

Now, as illustrated in the lower side of the drawing, feature points are assumed to be obtained for each local region of the out-image AP11. In the lower side of the drawing, one circle, more specifically, a circle with no diagonal represents one feature point at a time t and a circle with diagonals represents a feature point at a time t+1.

In this case, the camera blur correction unit 84 obtains the motion vector C as motion information, that is, the motion vector of each local region, and the position of the feature point at the time t+1 based on the position of each feature point at the time t. Then, the camera blur correction unit 84 obtains deformation parameters a to l satisfying the following Expression (2) and Expression (3) as affine parameters. Here, P feature points are assumed to be on the out-image AP11.

[Math. 2]

$$\underset{a,b,c,d,e,f,g,h,i,j,k,l}{\operatorname{argmin}} \sum_p \left\| \begin{bmatrix} x \\ y \\ z \end{bmatrix} - \begin{bmatrix} s \\ t \\ u \end{bmatrix} \right\| \quad (2)$$

[Math. 3]

$$\begin{bmatrix} x \\ y \\ z \end{bmatrix} = \begin{bmatrix} a & b & c \\ d & e & f \\ g & h & i \end{bmatrix} \begin{bmatrix} X \\ Y \\ Z \end{bmatrix} + \begin{bmatrix} j \\ k \\ l \end{bmatrix} \quad (3)$$

In Expression (2), a vector having elements s, t, and u indicates the coordinates of the feature points of the out-image AP11 at the time t. That is, the vector having the elements s, t, and u indicates the coordinates of the feature points represented by the circles with no diagonal in FIG. 7.

In Expression (3), a vector having elements X, Y, and Z indicates the coordinates of the feature points of the out-image AP11 at the time t+1 obtained from the motion information. That is, the vector having elements X, Y, and Z indicates the coordinates of the feature points represented by the circles with the diagonals in FIG. 7.

Expression (3) indicates image deformation in which the feature points at the time t+1 in FIG. 7 overlap the feature points at the time t, that is, a deformation expression of the affine transform. Accordingly, in Expression (2) and Expression (3), a vector having elements x, y, and z indicates the coordinates of the feature points after the deformation when the image deformation is performed on the coordinates of the feature points of the out-image AP11 at the time t+1 using the affine parameters.

When the deformation parameters a to l are calculated, as indicated in Expression (2), the deformation parameters a to l are obtained for the P feature points matched with each other so that differences between the positions of the feature points at the time t+1 after the deformation and the positions of the feature points at the time t, that is, a transform error is the minimum.

When the affine parameters are obtained in this way, the camera blur correction unit 84 performs motion correction by performing image deformation indicated in the foregoing Expression (3) using the obtained affine parameters and deforming the actual out-image at the time t+1 supplied from the out-image capturing unit 23. That is, the camera shake component is removed from the out-image, the camera blur correction is performed, and the out-image obtained as the result is supplied to the recording unit 54. In the camera blur correction by the image deformation (image transform) indicated in Expression (3), motions of translation, expansion and contraction, rotation, and distortion can be treated with.

Figure 4:
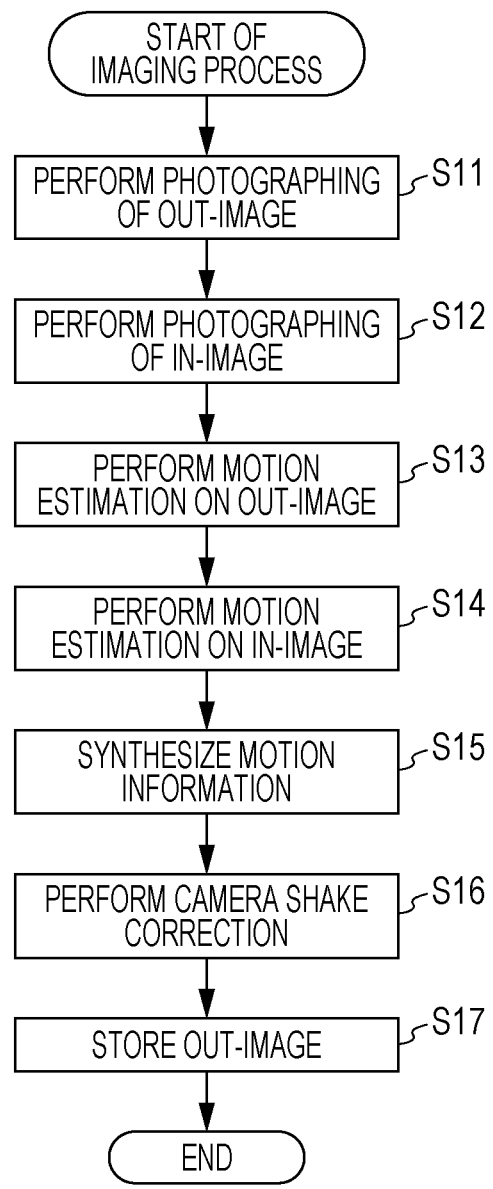
FIG. 4 is a flowchart for describing a photographing process.

Referring back to the flowchart of FIG. 4 to make the description, when the camera blur correction is performed on the out-image in step S16, the process proceeds to step S17.

In step S17, the recording unit 54 records the out-image supplied from the camera blur correction unit 84 under the control of the control unit 52, and then the photographing process ends.

As described above, the image processing device 11 performs the camera blur correction on the out-image based on the motion information acquired by obtaining the motion information of the image processing device 11 using the out-image and the in-image.

Thus, the motion of the image processing device 11 can be estimated with higher accuracy using both of the out-image and the in-image. Thus, even when the image processing device 11 moves more complexly at the time of the photography of the out-image, a shake component occurring in the motion of the image processing device 11 can be removed with higher accuracy. That is, it is possible to obtain the out-image with high quality and higher sharpness.

In other words, in the image processing device 11, by performing the photographing control on the images using information regarding the images obtained through the photographing in two different directions, the photographing control can be performed using more pieces of information compared to a case in which one image is photographed. Thus, it is possible to obtain the out-image with higher quality.

The example in which the camera blur correction is performed on the out-image has been described above. However, the camera blur correction may be performed on the in-image through the same process and the in-image obtained as the result may be recorded.

Modification Example 1 of First Embodiment

Configuration Example 2 of Image Processing Device

As described above, the motion vector C has been obtained by synthesizing the motion vector A obtained from the out-image and the motion vector B obtained from the in-image. However, a motion vector obtained by a sensor may be also synthesized in addition to the motion vectors.

Figure 8:
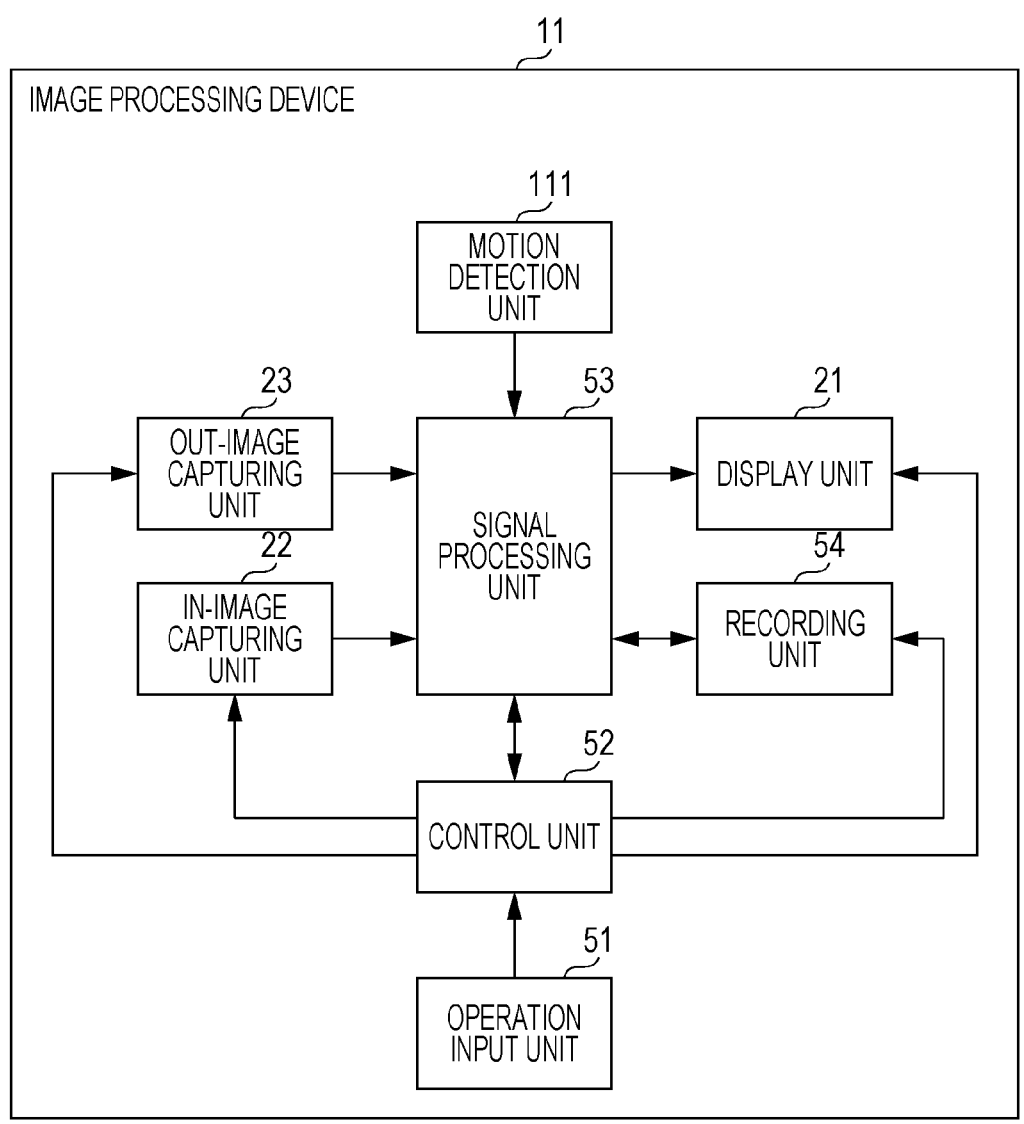
FIG. 8 is a diagram illustrating a configuration example of an image processing device.

In this case, the image processing device 11 has, for example, a configuration illustrated in FIG. 8. In FIG. 8, the same reference numerals are given to constituent elements corresponding to the constituent elements illustrated in FIG. 2 and the description thereof will be appropriately omitted.

The image processing device 11 illustrated in FIG. 8 is configured such that a motion detection unit 111 is further installed in the image processing device 11 in FIG. 2.

The motion detection unit 111 includes, for example, an acceleration sensor or a gyro sensor, detects a motion of the image processing device 11, and supplies a motion vector D indicating the detection result as motion information to the synthesis unit 83 of the signal processing unit 53.

Here, the signal processing unit 53 of the image processing device 11 in FIG. 8 has the configuration of the signal processing unit 53 illustrated in FIG. 3. The synthesis unit 83 of the signal processing unit 53 synthesizes motion information supplied from the motion estimation unit 81, motion information supplied from the motion estimation unit 82, and the motion information supplied from the motion detection unit 111 and supplies the synthesized motion information to the camera blur correction unit 84.

[Description 2 of Photographing Process]

Figure 9:
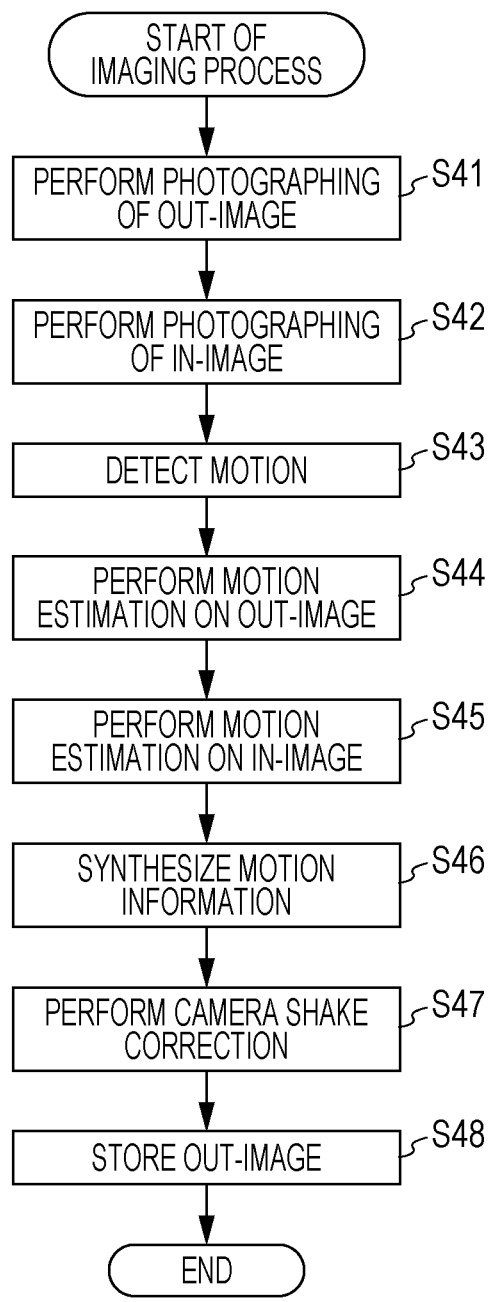
FIG. 9 is a flowchart for describing a photographing process.

Next, a photographing process performed when the image processing device 11 has the configuration illustrated in FIG. 8 will be described with reference to the flowchart of FIG. 9. Since processes of step S41 and step S42 are the same as the processes of step S11 and step S12 of FIG. 4, the description thereof will be omitted.

In step S43, the motion detection unit 111 detects a motion of the image processing device 11 and supplies the motion vector D indicating the detection result as the motion information to the synthesis unit 83.

When the motion vector D is calculated, processes of step S44 and step S45 are subsequently performed to perform motion estimation on an out-image and an in-image. Since these processes are the same as the processes of step S13 and step S14 of FIG. 4, the description thereof will be omitted.

In step S46, the synthesis unit 83 synthesizes the motion information supplied from the motion estimation unit 81, the motion information supplied from the motion estimation unit 82, and the motion information supplied from the motion detection unit 111 and supplies the synthesized motion information to the camera blur correction unit 84. Specifically, for example, the synthesis unit 83 calculates the motion vector C by calculating the following Expression (4).

[Math. 4]

$$C = a1 \cdot A + b1 \cdot B + c1 \cdot D \qquad (4)$$

In Expression (4), c1 indicates a coefficient serving as a weight for the motion vector D and coefficients a1, b1, and c1 are determined so that "a1+b1+c1=1.0" is satisfied. Accordingly, in Expression (4), weighted addition is performed on the motion vector A, the motion vector B, and the motion vector D as the motion information, so that the motion vector C which is the final motion information of the image processing device 11 is obtained.

Thus, when the motion information of the image processing device 11 is obtained, processes of step S47 and step S48 are subsequently performed and the photographing process ends. Since these processes are the same as the process of step S16 and step S17 of FIG. 4, the description thereof will be omitted.

Thus, the image processing device 11 synthesizes the motion information obtained from the out-image and the in-image and the motion information obtained by the motion detection unit 111 and performs the camera blur correction on the out-image based on the motion information obtained as the result.

Accordingly, by using not only the motion information obtained from the out-image and the in-image but also the motion information obtained by the motion detection unit 111, it is possible to estimate the motion of the image processing device 11 with higher accuracy. Thus, since the shake component can be removed through the camera blur correction with higher accuracy, it is possible to obtain the out-image with higher quality.

Second Embodiment

Configuration Example 2 of Signal Processing Unit

The example in which the camera blur correction of the out-image is performed as the photographing control has been described above. However, adjustment of a field angle of an out-image may be performed as photographing control.

Figure 10:
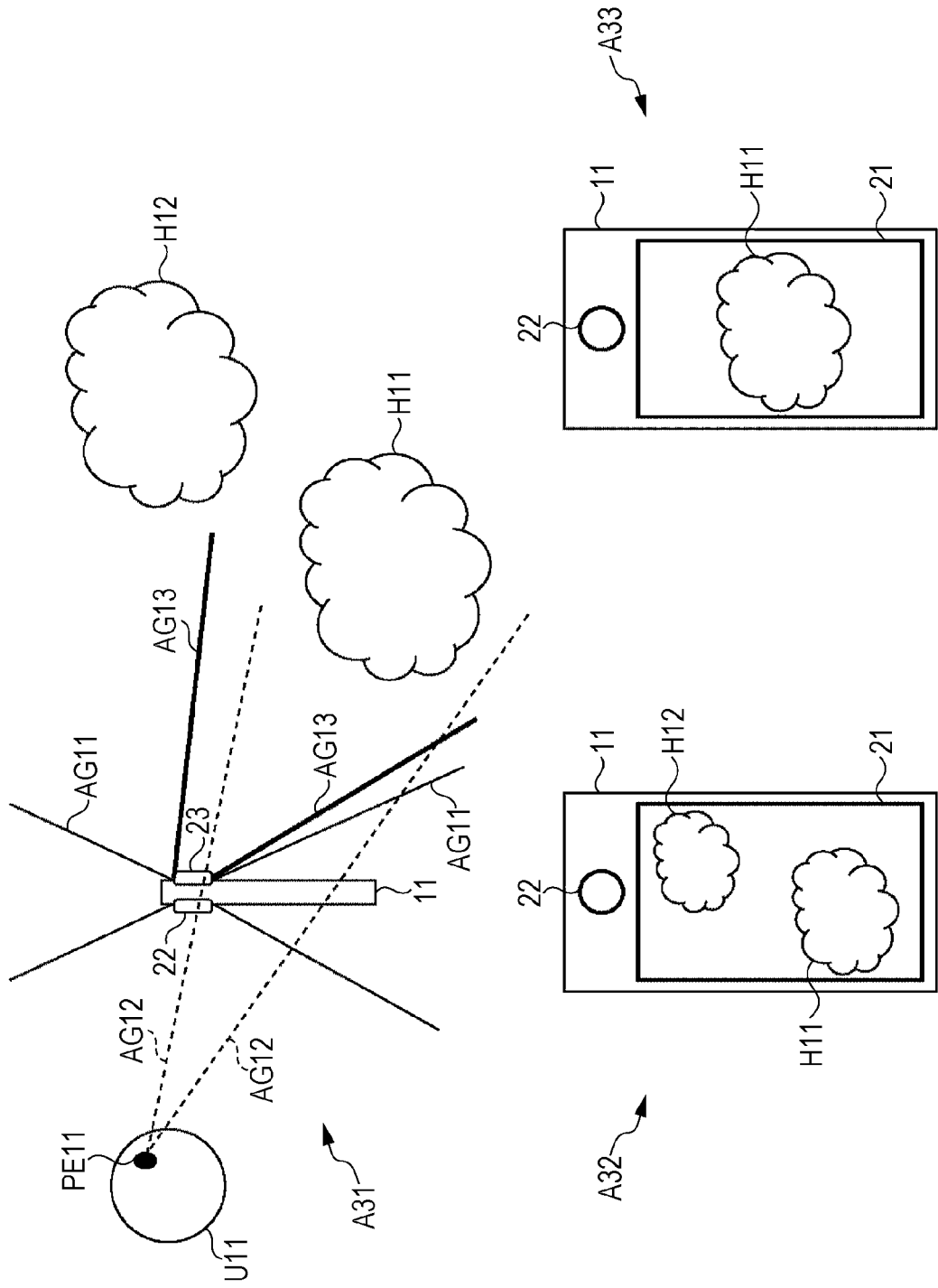
FIG. 10 is a diagram for describing field angle adjustment.

In this case, for example, as illustrated in FIG. 10, adjustment of a field angle of an out-image is performed according to a sight line direction of user who is a photographer.

Specifically, as indicated by an arrow A31, normally, when a user U11 images target subjects by orienting the out-image capturing unit 23 of the image processing device 11 in directions in which a subject H11 and a subject H12 are located, the user U11 performs the photographing, viewing images displayed on the display unit 21. Accordingly, since the position of the out-image capturing unit 23 photographing the out-image is actually different from a viewpoint position PE11 of the user U11 viewing the subject, an image intended by the user U11 may not necessarily be obtained.

In this example, straight lines AG11 indicate a field angle of the out-image capturing unit 23, that is, a photographing range, and two subjects H11 and H12 are contained within a region in the photographing range. For this reason, as indicated by an arrow A32, the subjects H11 and H12 are shown in the out-image photographed by the out-image capturing unit 23. Since the out-image is displayed on the display unit 21, the user U11 can perform photographing, viewing the display unit 21.

In practice, however, the user U11 may not desire to photograph both of the subjects H11 and H12. In this example, as indicated in the upper side of the drawing, when the user U11 views the subject H11 on the screen of the display unit 21, there is a high probability that the user U11 pays attention to the subject H11. In FIG. 10, dotted lines AG12 indicate a sight line of the user U11, that is, the range of a viewing field, and thus the sight line of the user U11 is oriented in the direction of the subject H11.

Thus, the image processing device 11 performs field angle control of the out-image capturing unit 23 as the photographing control of the out-image. For example, the image processing device 11 adjusts the field angle of the out-image capturing unit 23 so that the photographing range of the out-image capturing unit 23 is the range indicated by the straight lines AG13.

The adjustment of the field angle is realized, for example, by changing a zoom magnification or a diaphragm of the out-image capturing unit 23, inclining the out-image capturing unit 23, more specifically, an imaging unit in the out-image capturing unit 23, or performing image deformation on the out-image.

When the adjustment of the field angle of the out-image capturing unit 23, that is, the adjustment of the field angle of the out-image is performed, as indicated by an arrow A33, only the subject H11 is contained in the out-image. That is, the photographing range of the out-image capturing unit 23 becomes close to the range of the viewing field viewed from the viewpoint position PE11 of the user U11. Thus, an image shown near the viewpoint of the user U11 and close to an image intended by the user U11, that is, a higher-quality image can be obtained.

Figure 11:
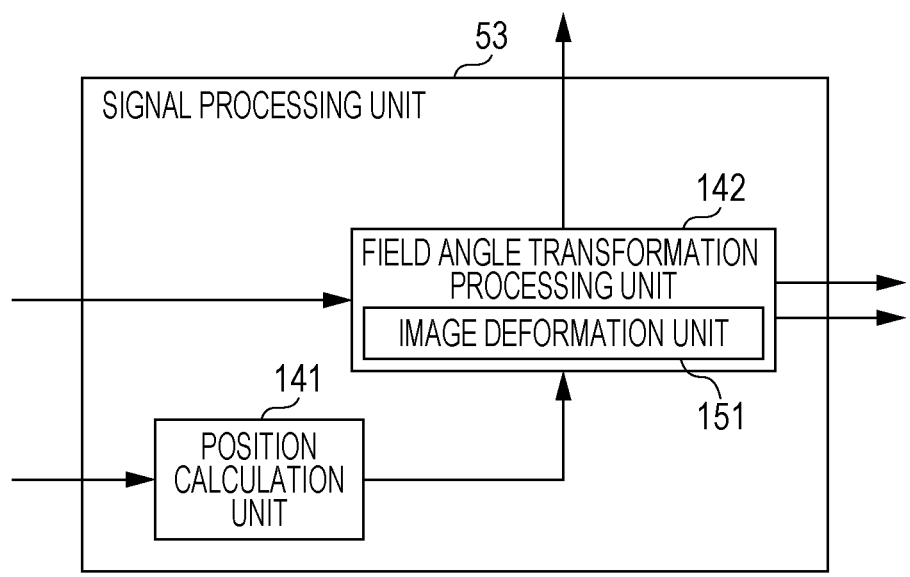
FIG. 11 is a diagram illustrating a configuration example of a signal processing unit.

When the adjustment of the field angle of the out-image is performed as the photographing control, the signal processing unit 53 of the image processing device 11 illustrated in FIG. 2 has a configuration illustrated in FIG. 11.

The signal processing unit 53 illustrated in FIG. 11 includes a position calculation unit 141 and a field angle transformation processing unit 142.

The position calculation unit 141 calculates a viewpoint position of the user, that is, a photographer who operates the image processing device 11 based on the in-image supplied from the in-image capturing unit 22 and supplies the viewpoint position to the field angle transformation processing unit 142.

The field angle transformation processing unit 142 calculates information necessary for the adjustment of the field angle of the out-image based on the viewpoint position supplied from the position calculation unit 141 and supplies the information to the control unit 52. The control unit 52 generates control information for controlling the out-image capturing unit 23 based on the information from the field angle transformation processing unit 142. Then, the control unit 52 performs the adjustment of the field angle by changing the zoom magnification or the diaphragm of the out-image capturing unit 23 or inclining the imaging unit of the out-image capturing unit 23 based on the control information.

The field angle transformation processing unit 142 includes an image deformation unit 151. The image deformation unit 151 transforms the field angle of the out-image by performing the image deformation on the out-image from the out-image capturing unit 23 according to the viewpoint position from the position calculation unit 141 and supplies the changed field angle to the display unit 21 and the recording unit 54.

[Description 3 of Photographing Process]

Next, a photographing process performed by the image processing device 11 will be described with reference to the flowchart of FIG. 12 when the signal processing unit 53 has the configuration illustrated in FIG. 11.

The photographing process is performed when a mode in which the photographing is performed while the adjustment of the field angle of the out-image is performed is selected by the user and an instruction to start photographing the out-image is given.

Since processes of step S71 and step S72 are the same as the processes of step S11 and step S12 of FIG. 4, the description thereof will be omitted. However, an out-image photographed in step S71 is supplied to the field angle transformation processing unit 142 and an in-image photographed in step S72 is supplied to the position calculation unit 141.

In step S73, the position calculation unit 141 calculates the viewpoint position of the user based on the in-image supplied from the in-image capturing unit 22.

For example, the position calculation unit 141 obtains the viewpoint position by detecting the face or eyes of the user from the in-image and calculating the position of the eyes of the user from the in-image capturing unit 22, that is, the distance up to the viewpoint position, the height of the viewpoint position, and an amount of deviation between the right and left of the viewpoint position with respect to the in-image capturing unit 22. The viewpoint position obtained in this way is a 3-dimensional position, that is, the position of the viewpoint of the user in a 3-dimensional coordinate system in which a predetermined position is set as a reference. Further, the sight line direction of the user may be obtained from the position of the pupils of the user in the in-image.

In step S74, the control unit 52 generates the control information for changing the field angle of the out-image capturing unit 23 based on the information supplied from the field angle transformation processing unit 142.

In step S75, the control unit 52 performs the adjustment of the field angle of the out-image by controlling the out-image capturing unit 23 based on the generated control information. Specifically, the control unit 52 performs the adjustment of the field angle by changing the zoom magnification or the diaphragm of the out-image capturing unit 23 or inclining the imaging unit of the out-image capturing unit 23.

Thus, the out-image subjected to the adjustment of the field angle to some extent is supplied from the out-image capturing unit 23 to the field angle transformation processing unit 142.

In step S76, the image deformation unit 151 adjusts the field angle of the out-image by performing the image deformation on the out-image supplied from the out-image capturing unit 23 based on the viewpoint position supplied from the position calculation unit 141 and supplies the adjusted field angle to the display unit 21 and the recording unit 54.

Here, the processes of step S74 to step S76 described above will be described in more detail.

For example, as illustrated in the upper side of FIG. 13, when the user U11 who is a photographer normally views the center of a display screen of the display unit 21 at the time of the photography of an out-image, the sight line direction of the user U11 is obtained based on the viewpoint position PE11 of the user U11 and the position of the display screen of the display unit 21. In the upper side of FIG. 13, the sight line of the user U11 is indicated by a dotted line bound by the viewpoint position PE11 and the image processing device 11. In FIG. 13, the same reference numerals are given to the portions corresponding to the portions in FIG. 10, and the description thereof will be appropriately omitted.

The field angle transformation processing unit 142 obtains the sight line direction of the user U11 based on the viewpoint position PE11 and the position of the display unit 21 in step S74. Further, the field angle transformation processing unit 142 determines which out-image can be acquired when the out-image capturing unit 23 is virtually moved to the viewpoint position PE11 based on the obtained sight line direction and the viewpoint position PE11.

Now, as indicated by an arrow Q11 in the upper side of the drawing, the out-image capturing unit 23 is assumed to be virtually moved to the viewpoint position PE11 of the user U11. In this example, an amount of movement of the out-image capturing unit 23 to the viewpoint position PE11, an amount of rotation of the out-image capturing unit 23, or the like can be calculated based on the position of the out-image capturing unit 23, the viewpoint position PE11, and the sight line direction of the user U11.

Therefore, the field angle transformation processing unit 142 uniquely determines to which position a point on a predetermined 3-dimensional space is projected on the display screen of the display unit 21 before the movement of the out-image capturing unit 23 and to which position the point is projected on the display screen of the display unit 21 after the movement of the out-image capturing unit 23.

Thus, the field angle transformation processing unit 142 obtains the 3-dimensional positions of three or more subjects, that is, positions on the 3-dimensional space through the estimation from the out-image and calculates affine parameters between two images shown in the foregoing Expression (3) based on the obtained 3-dimensional positions of the three or more points.

A technology for obtaining the positions before and after the movement of the projected point is described in, for example, "Multiple View Geometry in Computer Vision," by Richard Hartley and Andrew Zisserman in Cambridge University Press, March 2004.

Thus, when the affine parameters for transforming the out-image can be obtained in the image obtained at the time of the movement of the out-image capturing unit 23 to the viewpoint position PE11, the adjustment of the field angle is performed based on the affine parameters.

For example, the field angle transformation processing unit 142 supplies the obtained affine parameters to the control unit 52. Then, the control unit 52 generates the field angle of the out-image capturing unit 23, that is, the control information for changing the field angle of the out image based on the affine parameters from the field angle transformation processing unit 142. Here, the control information is, for example, information indicating an amount of transformation of the zoom magnification or the diaphragm of the out-image capturing unit 23 or an inclination angle of the imaging unit of the out-image capturing unit 23. The control unit 52 controls the out-image capturing unit 23 based on the control information and then performs the adjustment of the field angle.

The image deformation unit 151 performs the image deformation on the out-image based on the affine parameters to adjust the field angle of the out-image. That is, the image deformation unit 151 adjusts the field angle by performing signal processing (deformation process) on the out-image.

Here, translation or rotation components can be obtained in the affine parameters. Accordingly, for example, the zoom may correspond to translation in the Z axis direction illustrated in FIG. 6, the inclination of the imaging unit may correspond to rotation in the X axis direction illustrated in FIG. 6, and the image deformation may correspond to other adjustment of the field angle. In the rotation in the X axis direction, the imaging unit may be inclined by rotating the imaging unit using the X axis as a rotation axis.

Through the adjustment of the field angle, as illustrated in the lower side of FIG. 13, the out-image for which the out-image capturing unit 23 seems to be located at the viewpoint position PE11 of the user U11 who is the photographer can be acquired.

In this example, an out-image AP21 indicates an out-image photographed by the out-image capturing unit 23 before the adjustment of the field angle. In the out-image AP21, a point HP11 on the subject H11 is projected to the middle lower side in the out-image AP21.

On the other hand, an out-image AP22 indicates an out-image which is photographed by the out-image capturing unit 23 after the adjustment of the field angle and is subjected to the image deformation by the image deformation unit 151. In the out image AP22, the point HP11 on the subject H11 is projected to the middle upper side in the out-image AP22.

Thus, when the adjustment of the field angle is performed on the out-image, the out-image for which the user U11 seems to view the actual subject H11 through the display unit 21, that is, the high-quality out-image closer to the viewpoint of the user U11 can be obtained.

Figure 12:
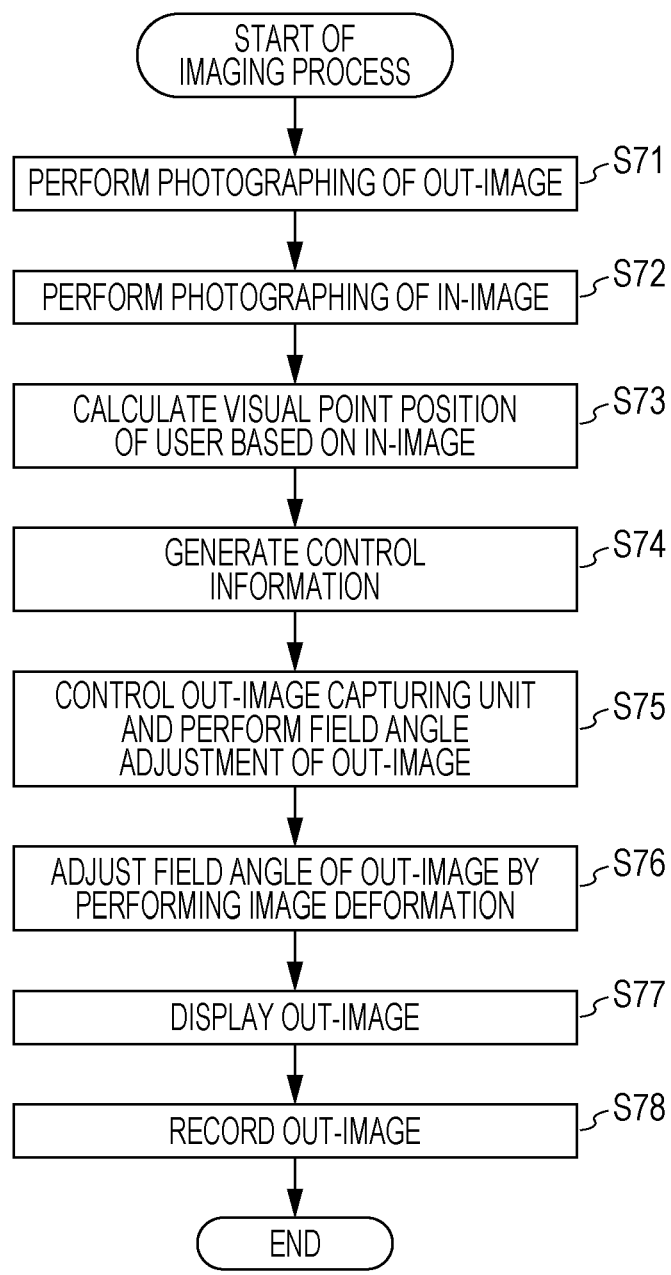
FIG. 12 is a flowchart for describing a photographing process.

Referring back to the flowchart of FIG. 12 to make the description, the process proceeds from step S76 to step S77 when the adjustment of the field angle on the out-image is performed and the out-image obtained as the result is supplied to the display unit 21 and the recording unit 54.

In step S77, the display unit 21 displays the out-image supplied from the field angle transformation processing unit 142 and obtained after the adjustment of the field angle.

In step S78, the recording unit 54 records the out-image supplied from the field angle transformation processing unit 142 and obtained after the adjustment of the field angle, and then the photographing process ends.

As described above, the image processing device 11 obtains the viewpoint position of the user based on the in-image and performs the adjustment of the field angle of the out-image based on the viewpoint position. Thus, by performing the adjustment of the field angle on the out-image, the out-image according to the sight line of the user can be obtained. That is, it is possible to acquire the higher-quality out-image closer to the viewpoint of the user.

As described above, the example has been described in which both of the adjustment of the field angle by the out-image capturing unit 23 and the adjustment of the field angle by the image deformation of the image deformation unit 151, such as the adjustment of the zoom magnification or the diaphragm, are performed. However, only one of the adjustments of the field angle may be performed.

Third Embodiment

Configuration Example 3 of Signal Processing Unit

Control may be performed as photographing control such that a sight line direction of the user is detected from an in-image and a focal point, lightness, white balance, or the like is adapted in correspondence with a gaze position of a user on an out-image obtained by the sight line direction.

Figure 14:
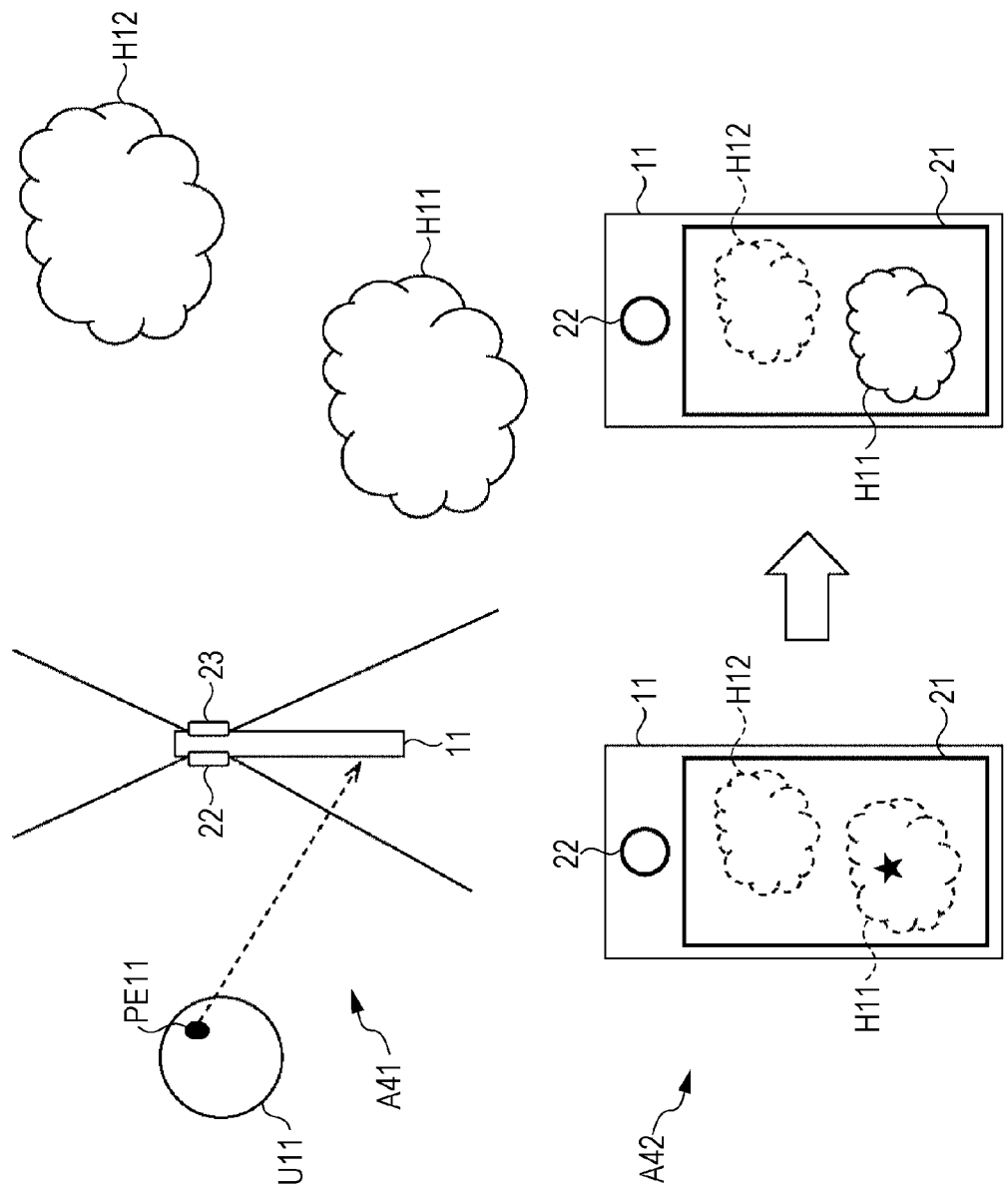
FIG. 14 is a diagram for describing focal point adjustment.

In this case, for example, as indicated by an arrow A41 of FIG. 14, the image processing device 11 photographs an image of the user U11 who is a photographer as an in-image and obtains a viewpoint position PE11 of the user U11 based on the in-image. In FIG. 14, the same reference numerals are given to constituent elements corresponding to the constituent elements illustrated in FIG. 10 and the description thereof will be appropriately omitted.

In this example, the user U11 orients the out-image capturing unit 23 to two subjects H11 and H12 and photographs an out-image. At this time, an image received by the out-image capturing unit 23 is displayed as a preview image of the out-image on the display unit 21 installed on the surface (front surface) of the image processing device 11 on the side of the user U11.

The user U11 gives an instruction to perform photographing, viewing the preview image displayed on the display unit 21 and causes the out-image to be photographed. In FIG. 14, a dotted arrow oriented from the viewpoint position PE11 to the image processing device 11 indicates a sight line of the user U11.

When the image processing device 11 obtains the viewpoint position PE11 from the in-image, the image processing device 11 obtains the sight line direction of the user U11 based on the viewpoint position PE11 and specifies a gaze position of the user U11 on the out-image from the sight line direction, as indicated by an arrow A42.

In the image processing device 11 indicated by the arrow A42, the out-image, more particularly, the preview image of the out-image is displayed on the display unit 21 and the position indicated by a star mark on the subject H11 is assumed to be the gaze position of the user U11. The gaze position is a position at which the sight line of the user U11 and the display screen of the display unit 21 intersect each other and is a position of a region on the out-image which the user U11 pays attention to.

When the gaze position of the user U11 on the out-image is obtained, the image processing device 11 controls the out-image capturing unit 23 as the photographing control such that the subject H11 located at the gaze position on the out-image is focused. The image processing device 11 performs lightness adjustment or white balance adjustment so that the lightness (exposure) and white balance of the subject H11 located at the gaze position on the out-image are appropriate.

Thus, as illustrated in the lower right side of the drawing, the subject H11 is focused on the out-image and the lightness or the white balance of the subject H11 is appropriate. That is, it is possible to acquire the higher-quality out-image subjected to the focusing, the lightness adjustment, and the white balance adjustment by setting the subject which the user U11 pays attention to as a reference.

Figure 15:
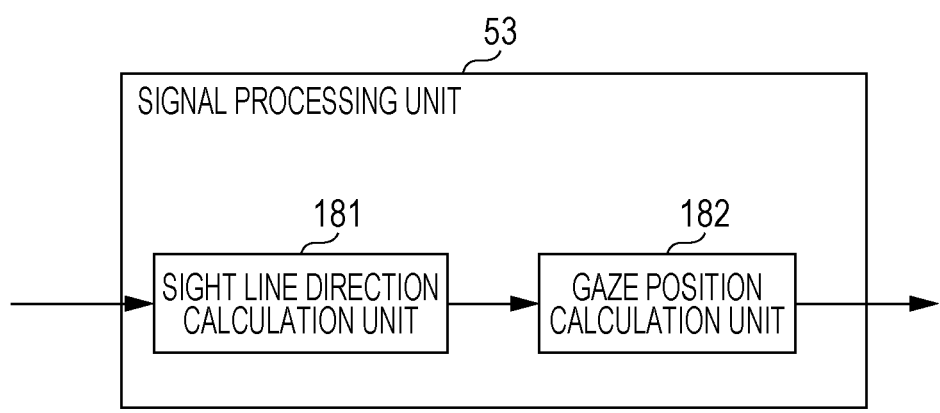
FIG. 15 is a diagram illustrating a configuration example of a signal processing unit.

Thus, when the focusing, the lightness adjustment, and the like are performed setting a gaze region of the user as a reference, the signal processing unit 53 of the image processing device 11 illustrated in FIG. 2 has, for example, a configuration illustrated in FIG. 15. The signal processing unit 53 illustrated in FIG. 15 includes a sight line direction calculation unit 181 and a gaze position calculation unit 182.

The sight line direction calculation unit 181 calculates a sight line direction of the user operating the image processing device 11 based on the in-image supplied from the in-image capturing unit 22 and supplies the sight line direction to the gaze position calculation unit 182.

The gaze position calculation unit 182 obtains the gaze position based on the sight line direction supplied from the sight line direction calculation unit 181 and supplies the gaze position to the control unit 52. The control unit 52 generates control information based on the gaze position from the gaze position calculation unit 182 so that the subject at the gaze position on the out-image is focused and the exposure (lightness) and the white balance of the subject at the gaze position are appropriate. Then, the control unit 52 controls the out-image capturing unit 23 based on the generated control information.

[Description 4 of Photographing Process]

Figure 16:
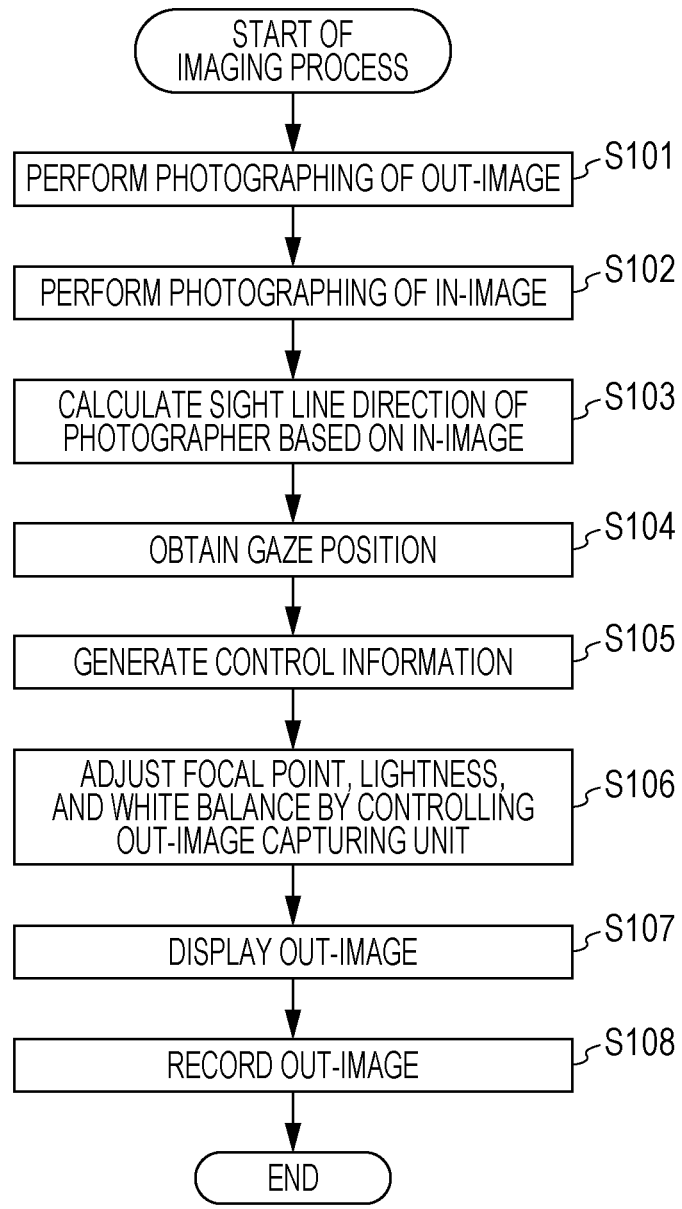
FIG. 16 is a flowchart for describing a photographing process.

Next, a photographing process performed when the signal processing unit 53 has the configuration illustrated in FIG. 15 will be described with reference to the flowchart of FIG. 16. Since processes of step S101 and step S102 are the same as the processes of step S11 and step S12 of FIG. 4, the description thereof will be omitted.

In step S103, the sight line direction calculation unit 181 calculates the sight line direction of the user who is a photographer based on the in-image supplied from the in-image capturing unit 22 and supplies the sight line direction to the gaze position calculation unit 182. For example, the sight line direction calculation unit 181 obtains the viewpoint position of the user by performing the same process as the process of step S73 of FIG. 12 and obtains the sight line direction of the user based on the viewpoint position. For example, the viewpoint position is calculated by detecting the positions of the face and eyes of the user from the in-image and the sight line direction is specified based on the viewpoint position and the positions of the pupils of the user on the in-image.

In step S104, the gaze position calculation unit 182 obtains the gaze position based on the sight line direction supplied from the sight line direction calculation unit 181 and the viewpoint position and supplies the gaze position to the control unit 52. For example, the gaze position calculation unit 182 obtains the gaze position on the out-image based on the sight lie direction of the user, the viewpoint position of the user, and the position of the display unit 21.

In step S105, the control unit 52 generates control information used for focal point adjustment, lightness adjustment, and white balance adjustment of the out-image capturing unit 23 based on the gaze position supplied from the gaze position calculation unit 182.

For example, based on the gaze position, the control unit 52 generates the control information used for the focal point adjustment, the exposure adjustment, and the white balance adjustment by which the subject at the gaze position is focused and the lightness and the white balance of the subject are optimum.

In step S106, the control unit 52 performs the adjustment of the focal point position, the lightness, and the white balance by controlling the out-image capturing unit 23 based on the control information. Thus, the out-image in which the subject at the gaze position of the user is focused and the lightness and the white balance of the subject are appropriately adjusted is supplied from the out-image capturing unit 23 to the signal processing unit 53. Further, the signal processing unit 53 supplies the out-image supplied from the out-image capturing unit 23 to the display unit 21 and the recording unit 54.

Here, the example in which the out-image capturing unit 23 performs the lightness adjustment and the white balance adjustment has been described. However, the lightness adjustment or the white balance adjustment may be performed by the signal processing unit 53.

In step S107, the display unit 21 displays the out-image supplied from the signal processing unit 53. Then, in step S108, the recording unit 54 records the out-image supplied from the signal processing unit 53, and then the photographing process ends.

As described above, the image processing device 11 specifies the gaze position of the out-image which the user pays attention to based on the sight line direction of the user obtained from the in-image and performs the focal point adjustment or the lightness adjustment based on the gaze position. Accordingly, it is possible to acquire the higher-quality out-image in which the subject which the user pays attention to is focused and the lightness or the white balance of the subject is appropriate. Further, in this case, the focal point and the lightness are appropriately adjusted although the user does not particularly perform an input operation. Therefore, convenience can be improved.

Fourth Embodiment

Configuration Example 4 of Signal Processing Unit

The example in which the photographing control of the out-image is performed has been described above. However, photographing control of an in-image may be performed based on the in-image and an out-image.

Figure 17:
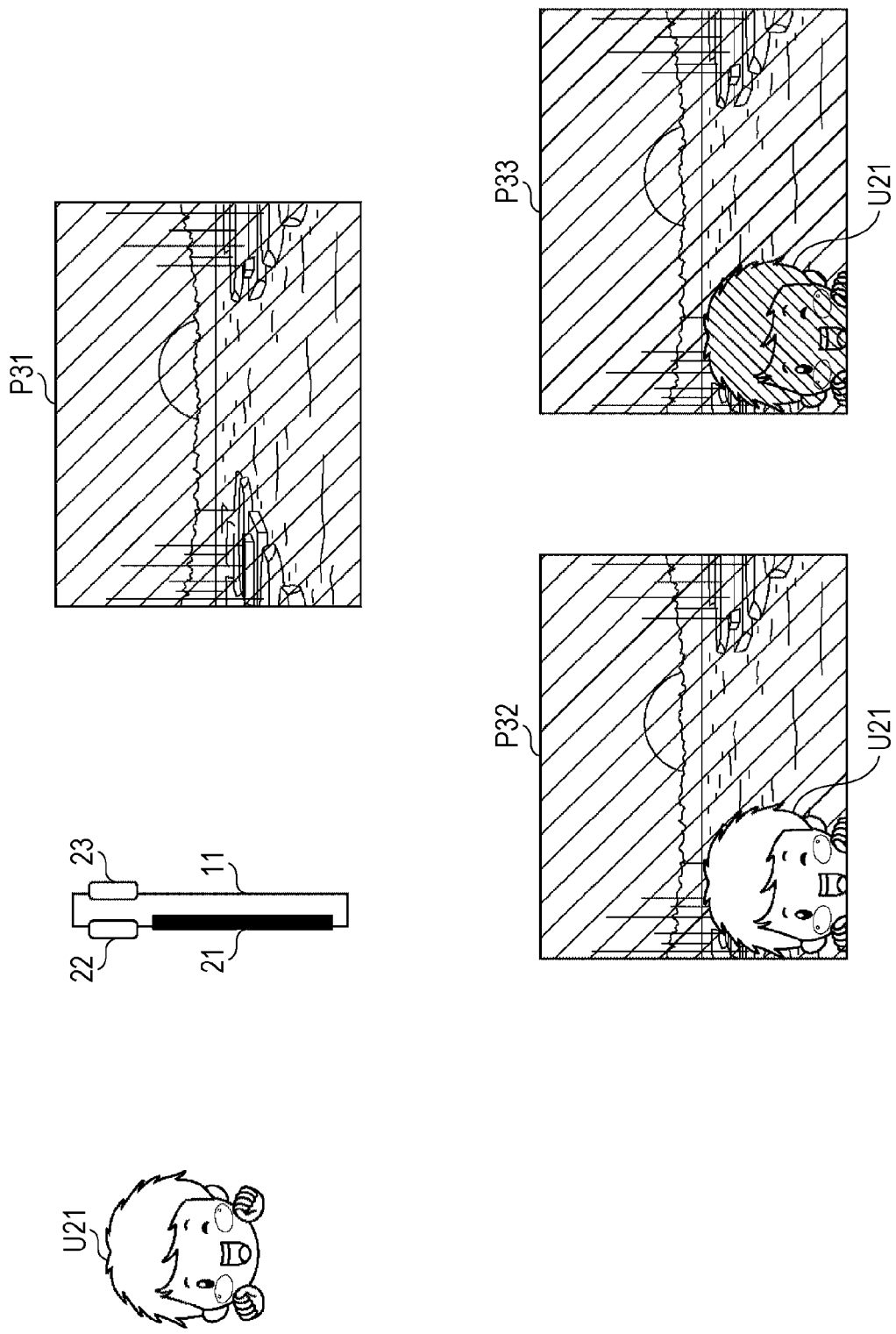
FIG. 17 is a diagram for describing light source matching.

Specifically, for example, as illustrated in FIG. 17, a user U21 who is a photographer is assumed to orient the out-image capturing unit 23 of the image processing device 11 from a room to the outside to photograph a sunset landscape as an out-image P31 and photograph the user U21 as an in-image. Then, the image processing device 11 is assumed to synthesize the in-image on the out-image P31 and acquire a synthesized image obtained as the result as a final image which the user U21 intends to acquire.

In this case, light sources of light with which a subject is radiated at the time of the photography differ in the inside and the outside of the room. That is, the white balance of the out-image P31 and the white balance of the in-image are not identical. For this reason, when the in-image is simply synthesized with the out-image, for example, an image in which color balance is unnatural between the user U21 on the in-image and the background as in a synthesized image P32 may be obtained in some cases. In this example, the color of the background (landscape) of the synthesized image P32 is dark, but the color of the user U21 is bright since the user U21 is photographed indoors.

Accordingly, the image processing device 11 preliminarily photographs the in-image at the time of the photography of the out-image P31 and obtains white balance values of the acquired out-image P31 and the in-image. Then, the image processing device 11 causes the display unit 21 to emit light so that hues of the in-image and the out-image P31 are the same based on the white balance values. That is, the image processing device 11 obtains a light source color for adapting the white balance of the in-image intended to be photographed from the now to the white balance of the out-image P31, causes the display unit 21 to emit light with the light source color, and re-photographs an in-image. Then, the image processing device 11 synthesizes the already photographed out-image P31 and the re-photographed in-image to generate a synthesized image P33.

At the time of the re-photography of the in-image, the user U21 who is a subject is radiated with appropriate light when the display unit 21 emits the light. Therefore, the in-image is photographed under the same light source as the light source of the case in which the out-image P31 is photographed, and thus the hue of the user U21 on the acquired in-image is the same as the hue of the out-image P31 which is the background. That is, the white balance of the out-image P31 is identical with the white balance of the in-image. Accordingly, the synthesized image P33 with the natural hue can be acquired without performing white balance adjustment on the photographed image.

Thus, by performing the photographing control on the in-image based on the white balance values of the out-image and the in-image, the light source of the out-image is matched with the light source of the in-image and the synthesized image with the natural hue, that is, a higher-quality synthesized image can be acquired. The photographing control is effective particularly, for example, when the outside under the sun is photographed in the inside illuminated with a fluorescent lamp or the like and an in-image photographed in the inside and an out-image photographed outside are synthesized.

Figure 18:
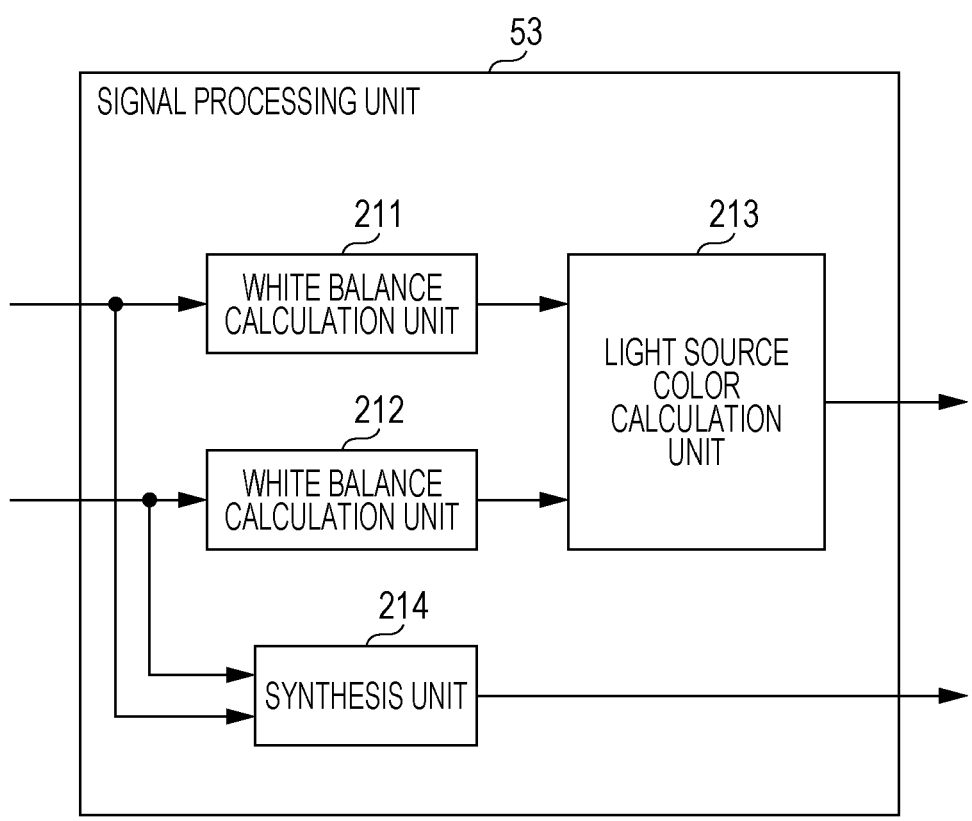
FIG. 18 is a diagram illustrating a configuration example of a signal processing unit.

When the photographing control is performed, the signal processing unit 53 of the image processing device 11 in FIG. 2 has, for example, a configuration illustrated in FIG. 18.

The signal processing unit 53 illustrated in FIG. 18 includes a white balance calculation unit 211, a white balance calculation unit 212, a light source color calculation unit 213, and a synthesis unit 214.

The white balance calculation unit 211 calculates the white balance value of the out-image supplied from the out-image capturing unit 23 and supplies the white balance value to the light source color calculation unit 213. The white balance calculation unit 212 calculates the white balance value of the in-image supplied from the in-image capturing unit 22 and supplies the white balance value to the light source color calculation unit 213.

The light source color calculation unit 213 calculates light source color information for adapting the white balance of the in-image to the white balance of the out-image based on the white balance values supplied from the white balance calculation unit 211 and the white balance calculation unit 212 and supplies the light source color information to the control unit 52. The control unit 52 generates control information for causing the display unit 21 to emit light based on the light source color information from the light source color calculation unit 213.

The synthesis unit 214 generates a synthesized image by synthesizing the out-image from the out-image capturing unit 23 and the in-image from the in-image capturing unit 22 and supplies the synthesized image to the recording unit 54.

[Description 5 of Photographing Process]

Here, when the user operates the operation input unit 51 to select a mode in which the out-image and the in-image are synthesized to generate the synthesized image and gives an instruction to start photographing, the image processing device 11 starts the photographing process and generates the synthesized image. Hereinafter, the photographing process performed when the signal processing unit 53 has the configuration illustrated in FIG. 18 will be described with reference to the flowchart of FIG. 19.

Since processes of step S131 and step S132 are the same as the processes of step S11 and step S12 of FIG. 4, the description thereof will be omitted. However, in step S131 and step S132, still images are photographed as the out-image and the in-image. In particular, the in-image photographed in step S132 is photographed to generate the light source color information and is not used for the synthesis with the out-image.

The out-image is supplied from the out-image capturing unit 23 to the white balance calculation unit 211 and the synthesis unit 214 and the in-image is supplied from the in-image capturing unit 22 to the white balance calculation unit 212 and the synthesis unit 214.

In step S133, the white balance calculation unit 211 calculates the white balance value of the out-image supplied from the out-image capturing unit 23 and supplies the white balance value to the light source color calculation unit 213. For example, the white balance calculation unit 211 calculates a white balance value Wr1 of an R (red) pixel of the out-image and a white balance value Wb1 of a B (blue) pixel of the out-image.

In step S134, the white balance calculation unit 212 calculates the white balance value of the in-image supplied from the in-image capturing unit 22 and supplies the white balance value to the light source color calculation unit 213. For example, the white balance calculation unit 212 calculates a white balance value Wr2 of an R (red) pixel of the in-image and a white balance value Wb2 of a B (blue) pixel of the in-image.

In step S135, the light source color calculation unit 213 determines whether the light sources of the out-image and the in-image are the same based on the white balance values from the white balance calculation unit 211 and the white balance values from the white balance calculation unit 212.

For example, the light source color calculation unit 213 determines that the light sources are the same, when the white balance values of the out-image and the in-image are the same, that is, Wr1=Wr2 and Wb1=Wb2.

In step S135, when it is determined that the light sources are not the same, that is, the light sources differ from each other, the process proceeds to step S136.

In step S136, the light source color calculation unit 213 generates the light source color information for adapting the white balance of the in-image to the white balance of the out-image based on the white balance values of the out-image and the in-image and supplies the light source color information to the control unit 52.

For example, the light source color calculation unit 213 performs calculation of the following Expression (5) and generates light source color information indicating a relation between the respective hues of R, G, and B when the display unit 21 is caused to emit light. That is, information indicating the relation of Expression (5) is the light source color information.

[Math. 5]

$$R:G:B = Wr1/Wr2 : 1 : Wb1/Wb2 \quad (5)$$

In step S137, the control unit 52 generates control information for causing the display unit 21 to emit the light with the hue indicated by the light source color information based on the light source color information supplied from the light source color calculation unit 213 and performs light-emission control of the display unit 21 based on the control information. That is, the control unit 52 causes the display unit 21 to emit the light with the hue indicated by Expression (5).

When the process of step S137 is performed or it is determined in step S135 that the light sources are the same, the in-image capturing unit 22 photographs the in-image in step S138 and supplies the in-image to the white balance calculation unit 212 and the synthesis unit 214.

For example, when the display unit 21 is caused to emit the light in step S137, the user who is a subject is radiated with the light from the light source under an indoor fluorescent lamp or the like through the light emission and the light from the display unit 21 and the in-image is consequently photographed under the light source which is identical with the light source of the out-image. That is, in the photographing of step S138, the in-image with the same white balance as that of the out-image acquired in step S131 can be acquired.

For example, when it is determined in step S135 that the light sources are the same, the display unit 21 does not emit the light. However, in this case, although the display unit 21 is particularly caused not to emit the light, the out-image and the in-image are photographed under the same light source. That is, the white balance of the in-image photographed in step S138 is identical with the white balance of the out-image photographed in step S131.

In step S139, the synthesis unit 214 generates the synthesized image by synthesizing the out-image supplied from the out-image capturing unit 23 and the in-image supplied from the in-image capturing unit 22 and supplies the synthesized image to the recording unit 54. Here, the out-image acquired in step S131 and the in-image acquired in step S138 are synthesized, so that the synthesized image is generated.

When the light sources of the out-image and the in-image are the same, the process of step S138 may not be performed and the out-image acquired in step S131 and the in-image acquired in step S132 may be synthesized.

In step S140, the recording unit 54 records the synthesized image supplied from the synthesis unit 214, and then the photographing process ends.

As described above, the image processing device 11 causes the display unit 21 to emit the light so that the white balance of the out-image is identical with the white balance of the in-image based on the white balance values of the out-image and the in-image. Then, the image processing device 11 re-photographs the in-image and generates the synthesized image by synthesizing the acquired in-image and the out-image.

Thus, by causing the display unit 21 to emit the light with the appropriate hue and adapting the white balance of the in-image to the white balance of the out-image, it is possible to acquire the synthesized image with a more natural hue. That is, a higher-quality synthesized image can be acquired.

In the image processing device 11, the white balance of the out-image can be identical with the white balance of the in-image by causing the display unit 21 installed on the same surface as the in-image capturing unit 22 photographing the in-image to emit light with an appropriate color (display an image with an appropriate color). That is, the light sources of the out-image and the in-image can be virtually caused to be identical. Accordingly, even when the light sources of the out-image and the in-image differ from each other, an image photographed under the same light source can be acquired, and thus the synthesized image with a more natural hue can be acquired.

Fifth Embodiment

Outer Appearance Configuration Example of Image Processing Device

As described above, the example has been described in which the display unit 21 is installed only on the front surface side of the image processing device 11, as illustrated in FIG. 1. However, display units may be installed on both of the front surface and the rear surface of an image processing device.

Figure 20:
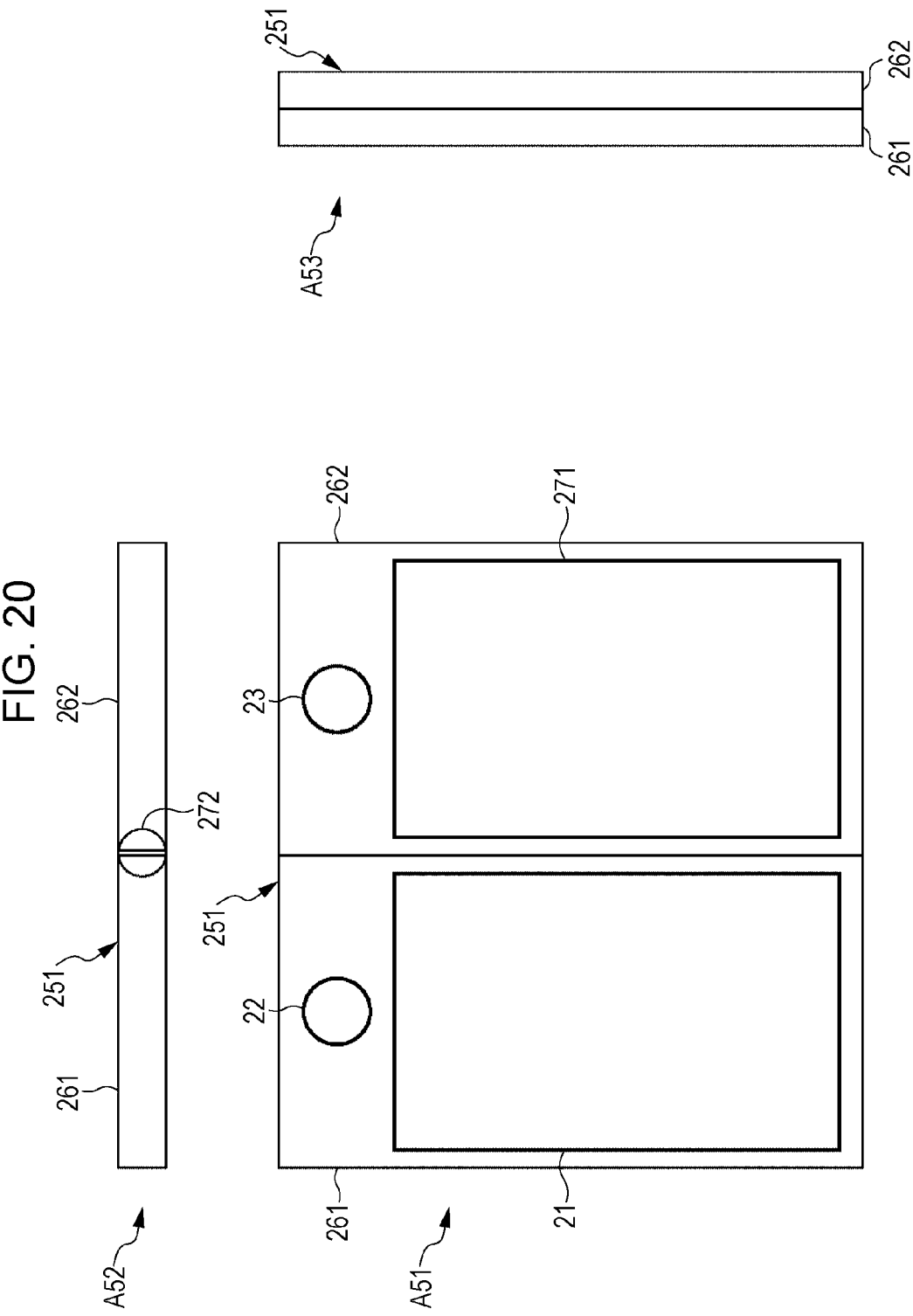
FIG. 20 is a diagram illustrating a configuration example of the outer appearance of an image processing device.

In this case, for example, the outer appearance of the image processing device is configured, as illustrated in FIG. 20. In FIG. 20, the same reference numerals are given to constituent elements corresponding to the constituent elements illustrated in FIG. 1 and the description thereof will be appropriately omitted.

A first surface 261 and a second surface 262 are installed in an image processing device 251 illustrated in FIG. 20, for example, as indicated by an arrow A51.

The display unit 21 and the in-image capturing unit 22 are installed on the first surface 261. For example, an in-image photographed by the in-image capturing unit 22 is displayed on the display unit 21. Further, the out-image capturing unit 23 and a display unit 271 are installed on the second surface 262. An out-image photographed by the out-image capturing unit 23 is displayed on the display unit 271. A touch panel (not illustrated) is installed to be superimposed on the display unit 271, and thus an input operation can be performed by a user.

In the example indicated by the arrow A51, the first surface 261 and the second surface 262 are arranged on the same plane. Further, when the image processing device 251 in the state indicated by the arrow A51 is viewed from the upper side of the drawing, as indicated by an arrow A52, a hinge mechanism 272 configured to rotate one of the first surface 261 and the second surface 262 with respect to the other thereof is installed between the first surface 261 and the second surface 262.

Accordingly, as indicated by an arrow A53, the first surface 261 and the second surface 262 can be folded by the user. In the folded state of the image processing device 251, the first surface 261 and the second surface 262 are superimposed so that the display unit 21 and the display unit 271 are located mutually outside. That is, in the state indicated by the arrow A53, the display unit 21 and the in-image capturing unit 22 are located to the left side in the drawing of the first surface 261 and the display unit 271 and the out-image capturing unit 23 are located to the right side in the drawing of the second surface 262.

Thus, when the user operates the image processing device 251 in the folded state of the image processing device 251, the user can perform an operation particularly without distinguishing the front surface and the rear surface from each other. For example, the user can operate the first surface 261 toward the user side and can also operate the second surface 262 toward the user side. Accordingly, an image photographed by an imaging unit oriented toward the user side is an in-image and an image photographed by an imaging unit oriented to the opposite side to the user is an out-image.

Hereinafter, to facilitate the description, the first surface 261 is referred to as a front surface and the second surface 262 is referred to as a rear surface. That is, the user is assumed to operate the first surface 261 toward the user side. Accordingly, an image photographed by the in-image capturing unit 22 is an in-image and an image photographed by the out-image capturing unit 23 is an out-image.

Configuration Example 3 of Image Processing Device

Figure 21:
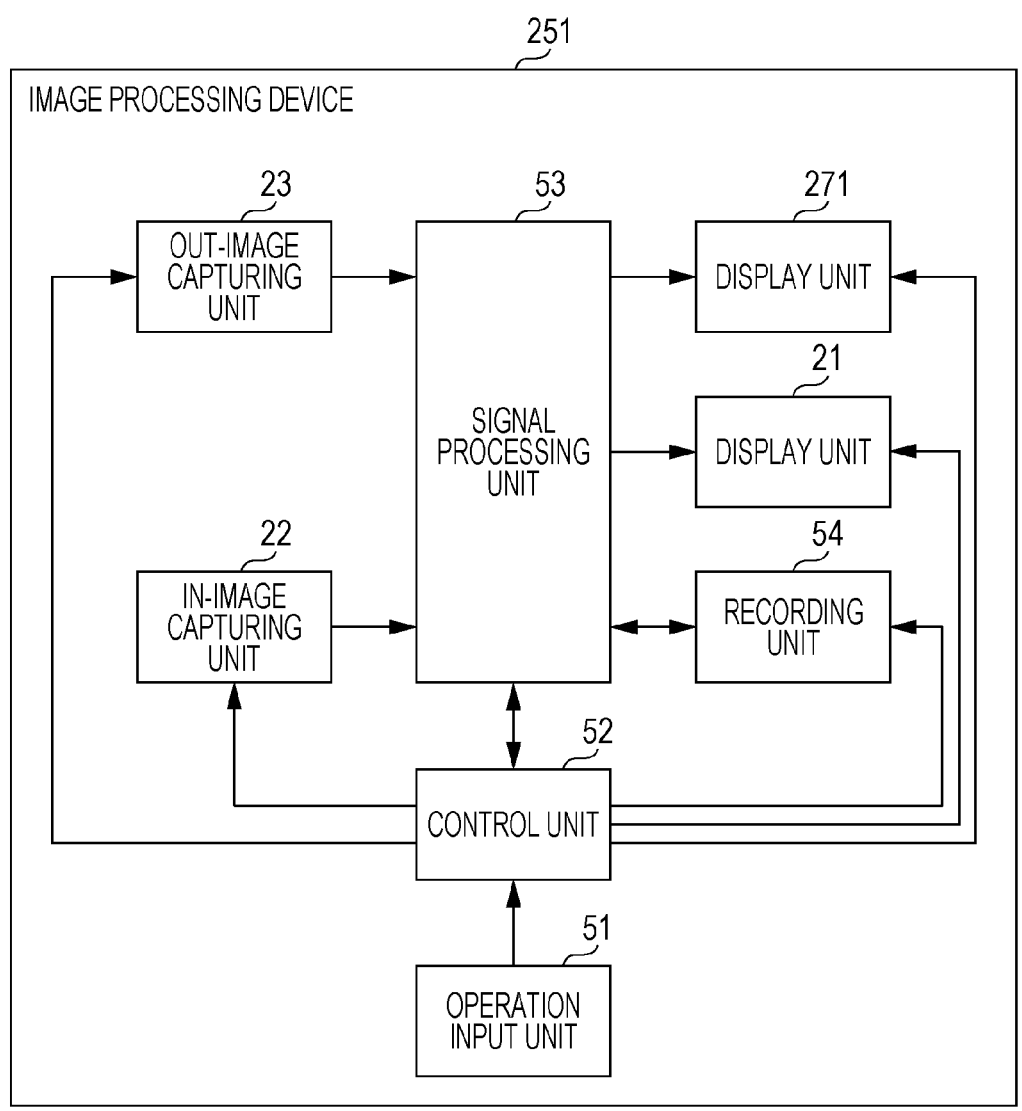
FIG. 21 is a diagram illustrating a configuration example of an image processing device.

More specifically, the image processing device 251 has a configuration illustrated in FIG. 21. In FIG. 21, the same reference numerals are given to constituent elements corresponding to the constituent elements illustrated in FIG. 2 or 20 and the description thereof will be appropriately omitted.

The image processing device 251 illustrated in FIG. 21 includes a display unit 21, a display unit 271, an in-image capturing unit 22, an out-image capturing unit 23, an operation input unit 51, a control unit 52, a signal processing unit 53, and a recording unit 54.

The image processing device 251 is configured such that the display unit 271 is further included with respect to the image processing device 11 illustrated in FIG. 2. The display unit 271 displays an image supplied from the signal processing unit 53 under the control of the control unit 52. In the display unit 271, a touch panel serving as the operation input unit 51 is installed to be superimposed, and thus the user can input various instructions by operating the touch panel serving as the operation input unit 51.

[Description 6 of Photographing Process]

The image processing device 251 having such a configuration can perform the same process as the photographing process performed by the above-described image processing device 11.

For example, when the image processing device 251 performs the same process as the photographing process described with reference to FIG. 19, the following process is performed. Hereinafter, a photographing process performed by the image processing device 251 will be described with reference to the flowchart of FIG. 22.

In this case, the signal processing unit 53 of the image processing device 251 has a configuration illustrated in FIG. 18. In the photographing process, the white balance of an image of the user photographed by the in-image capturing unit 22, that is, the white balance of the in-image is assumed to be adapted to the white balance of the out-image.

When the photographing process starts, processes of step S171 to step S175 are performed. Since these processes are the same as the processes of step S131 to step S135 of FIG. 19, the description thereof will be omitted.

When it is determined in step S175 that the light sources of the in-image and the out-image are different from each other, the process of step S176 is performed. That is, in step S176, the light source color calculation unit 213 calculates the foregoing Expression (5) based on white balance values of the out-image and the in-image and generates light source color information for adapting the white balance of the in-image to the white balance of the out-image.

The light source color calculation unit 213 supplies the light source color information acquired in this way to the control unit 52.

In step S177, the control unit 52 generates control information for causing the display unit 21 to emit light with a hue indicated by the light source color information supplied from the light source color calculation unit 213 and performs light-emission control of the display unit 21 located on an inside, that is, the user side based on the control information.

When the process of step S177 is performed or it is determined in step S175 that the light sources are the same, the in-image capturing unit 22 photographs an in-image of the user as a subject in step S178 and supplies the in-image to the white balance calculation unit 212 and the synthesis unit 214.

Thereafter, processes of step S179 and step S180 are performed, and then the photographing process ends. Since these processes are the same as the processes of step S139 and step S140 of FIG. 19, the description thereof will be omitted.

As described above, the image processing device 251 causes the display unit 21 to emit light so that the white balance of the out-image and the white balance of the in-image are identical with each other based on the white balance values of the out-image and the in-image. Then, the image processing device 251 re-photographs an in-image and generates a synthesized image by synthesizing the acquired in-image and the out-image.

Thus, by causing the display unit 21 to emit the light with the appropriately hue, it is possible to acquire the synthesized image with a more natural hue.

Another Example of Photographing Process

Figure 22:
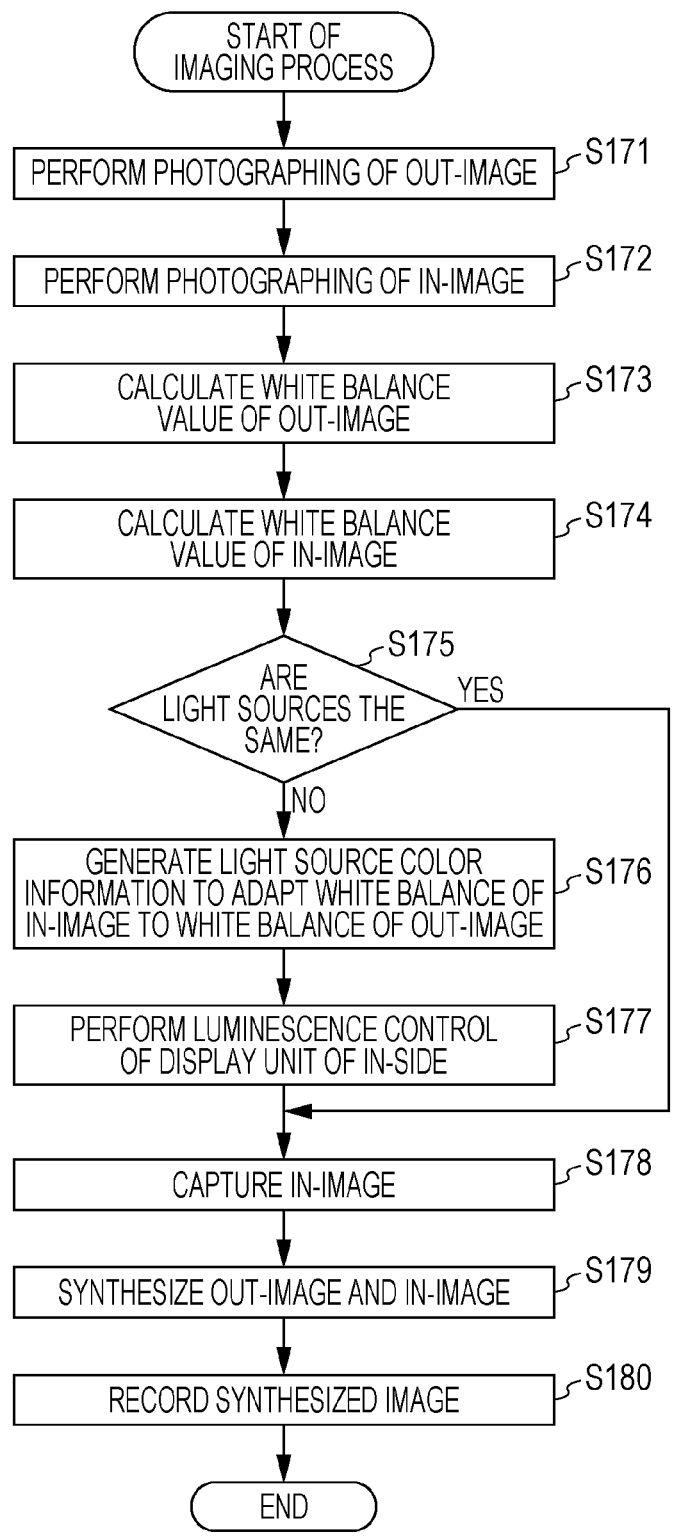
FIG. 22 is a flowchart for describing a photographing process.

In the photographing process described with reference to FIG. 22, the example has been described in which the white balance of the in-image is adapted to the white balance of the out-image. However, the white balance of the out-image may be adapted to the white balance of the in-image.

For example, in the image processing device 251, the display unit 271 is installed on the second surface 262 in which the out-image capturing unit 23 is installed. Therefore, when the display unit 271 is caused to appropriately emit light, the white balance of the out-image can be adapted to the white balance of the in-image. The photographing control is effective particularly when a subject of the out-image is located at a position close to the image processing device 251.

Figure 23:
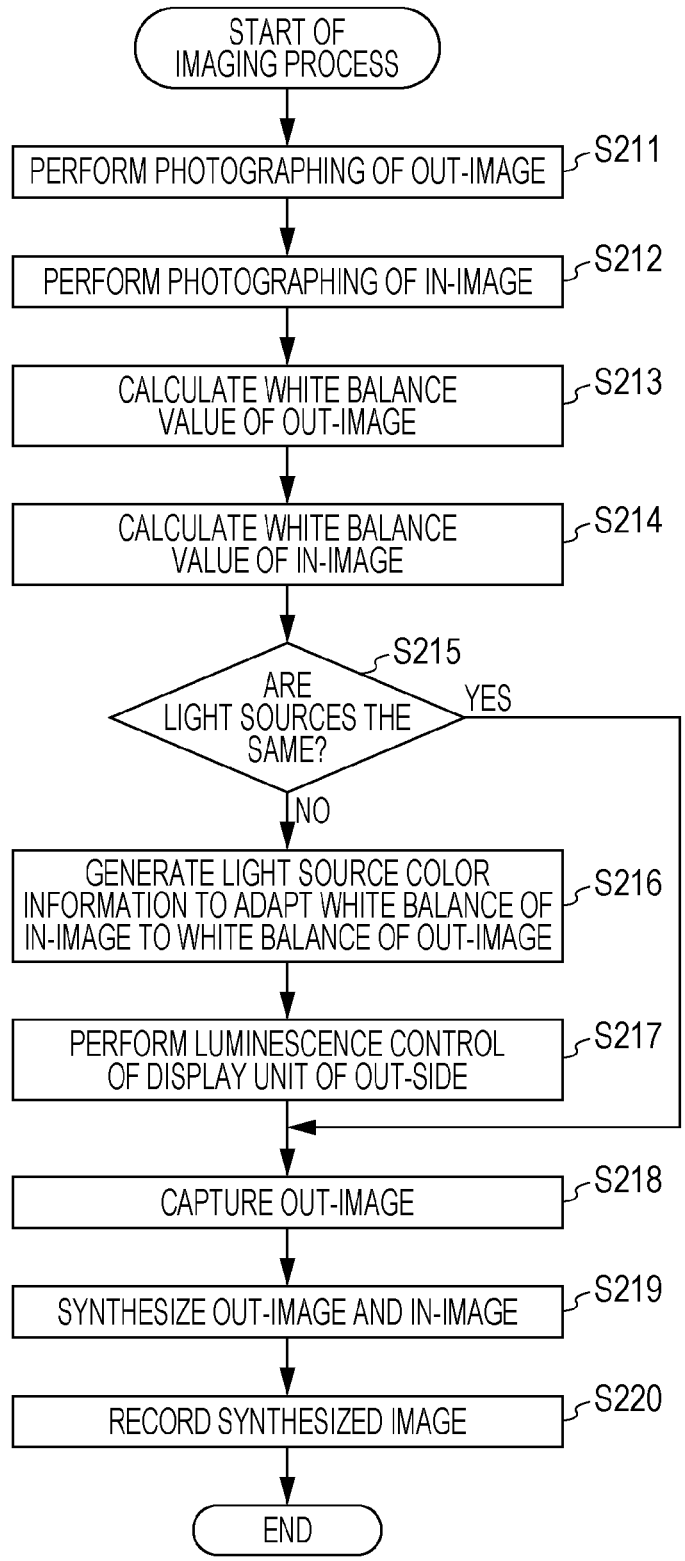
FIG. 23 is a flowchart for describing a photographing process.

Hereinafter, a photographing process performed by the image processing device 251 will be described with reference to the flowchart of FIG. 23 when the white balance of the out-image is adapted to the white balance of the in-image.

Figure 19:
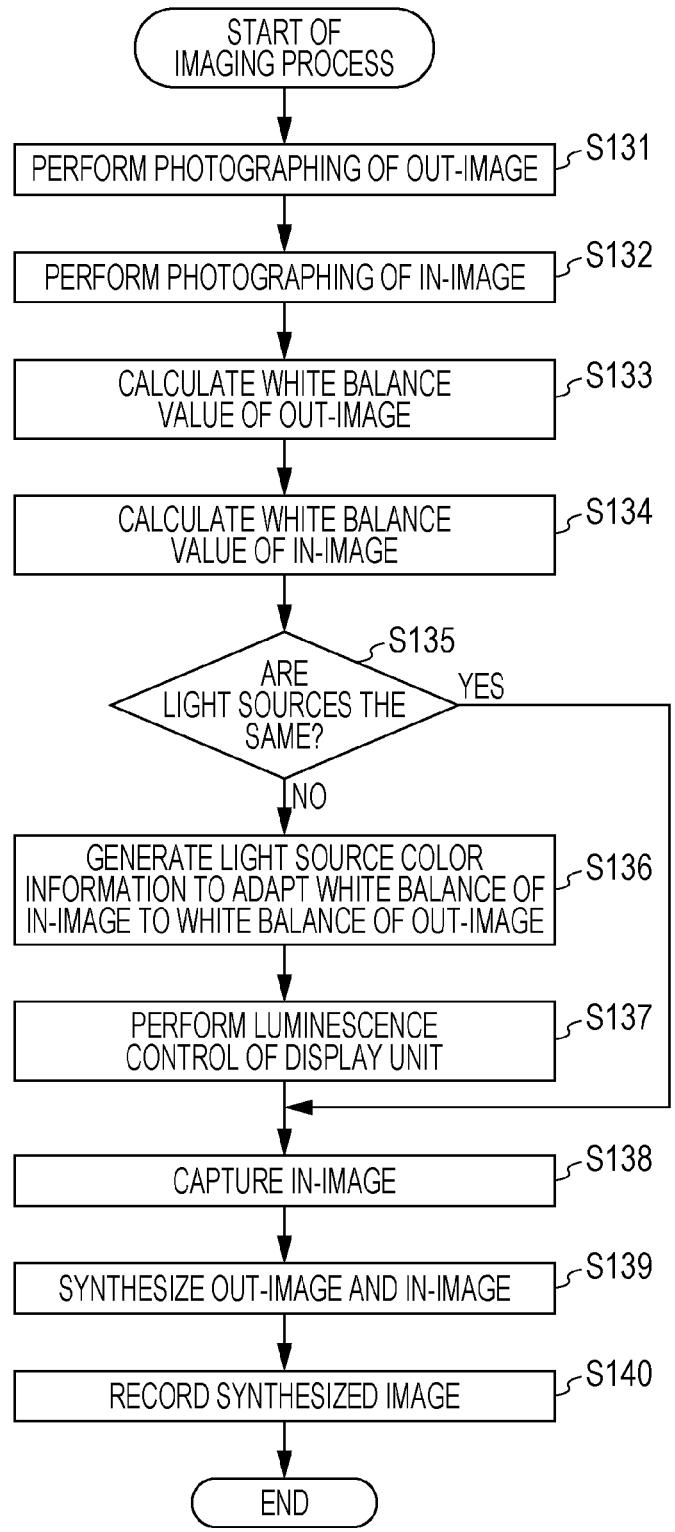
FIG. 19 is a flowchart for describing a photographing process.

Since processes of step S211 to step S215 are the same as the processes of step S131 of step S135 of FIG. 19, the description thereof will be appropriately omitted.

When it is determined in step S215 that the light sources are not the same, that is, the light sources differ from each other, the process proceeds to step S216.

In step S216, the light source color calculation unit 213 generates light source color information for adapting the white balance of the out-image to the white balance of the in-image based on the white balance values of the out-image and the in-image and supplies the light source color information to the control unit 52.

For example, the light source color calculation unit 213 performs calculation of the following Expression (6) and generates light source color information indicating a relation between the respective hues of R, G, and B when the display unit 271 is caused to emit light. That is, information indicating the relation of Expression (6) is the light source color information.

[Math. 6]

$$R:G:B = Wr2/Wr1:1:Wb2/Wb1 \qquad (6)$$

In step S217, the control unit 52 generates control information for causing the display unit 271 to emit light with a hue indicated by the light source color information from the light source color calculation unit 213 and performs light-emission control of the display unit 271 located on the outside, that is, the opposite side to the user side based on the control information. That is, the control unit 52 causes the display unit 271 to emit the light with the hue indicated by Expression (6). Accordingly, a subject of the out-image is radiated with the light from the display unit 271.

When the process of step S217 is performed or it is determined in step S215 that the light sources are the same, the out-image capturing unit 23 photographs the out-image in step S218 and supplies the out-image to the white balance calculation unit 211 and the synthesis unit 214.

For example, when the display unit 271 is caused to emit the light in step S217, the subject of the out-image is radiated with the light from the light source under an outside the sunlight or the like through the light emission and the light from the display unit 271 and the out-image is consequently photographed under the light source which is identical with the light source of the in-image. That is, in the photographing of step S218, the out-image with the same white balance as that of the in-image acquired in step S212 can be acquired.

For example, when it is determined in step S215 that the light sources are the same, the display unit 271 does not emit the light. However, in this case, the in-image and the out-image are photographed under the same light source.

When the out-image is re-photographed in this way, processes of step S219 and step S220 are subsequently performed, and then the photographing process ends. Since these processes are the same as the processes of step S139 and step S140 of FIG. 19, the description thereof will be omitted. However, in step S219, the in-image acquired in step S212 and the out-image acquired in step S218 are synthesized.

As described above, the image processing device 251 causes the display unit 271 to emit the light so that the white balance of the in-image is identical with the white balance of the out-image based on the white balance values of the out-image and the in-image. Then, the image processing device 251 re-photographs the out-image and generates the synthesized image by synthesizing the acquired out-image and the acquired in-image.

Thus, by causing the display unit 271 to emit the light with the appropriate hue and adapting the white balance of the out-image to the white balance of the in-image, it is possible to acquire the synthesized image with a more natural hue. That is, a higher-quality synthesized image can be acquired.

The image processing device 251 may be configured such that the user can select whether the display unit 21 is caused to emit the light or the display unit 271 is caused to emit the light. When the user can select whether the display unit 21 or the display unit 271 is caused to emit the light, for example, when the display unit installed on the surface at which a subject is closer to the image processing device 251 is caused to display the light, a more natural synthesized image can be acquired.

The above-described series of processes may be performed by hardware or may be performed by software. When the series of processes is performed by software, a program of the software is installed in a computer. Here, examples of the computer include a computer embedded in dedicated hardware or a general-purpose personal computer capable of executing various functions by installing various programs.

FIG. 24 is a block diagram illustrating a hardware configuration example of a computer executing the above-described series of processes by a program.

In the computer, a central processing unit (CPU) 501, a read-only memory (ROM) 502, and a random access memory (RAM) 503 are connected to each other by a bus 504.

Further, an input/output interface 505 is connected to the bus 504. An input unit 506, an output unit 507, a recording unit 508, a communication unit 509, and a drive 510 are connected to the input/output interface 505.

The input unit 506 is configured by a keyboard, a mouse, a microphone, an imaging element, or the like. The output unit 507 is configured by a display, a speaker, or the like. The recording unit 508 is configured by a hard disk, a non-volatile memory, or the like. The communication unit 509 is configured by a network interface or the like. The drive 510 drives a removable medium 511 such as a magnetic disk, an optical disc, a magneto-optical disc, or a semiconductor memory.

In the computer having the above-described configuration, for example, the CPU 501 performs the above-described series of processes by loading the program recorded on the recording unit 508 to the RAM 503 via the input/output interface 505 and the bus 504 and executing the program.

For example, the program executed by the computer (the CPU 501) can be recorded and shared in the removable medium 511 serving as a package medium. The program can be provided via a wired or wireless transmission medium such as a local area network, the Internet, or digital satellite broadcast.

In the computer, the program can be installed on the recording unit 508 via the input/output interface 505 by mounting the removable medium 511 on the drive 510. The program can be received by the communication unit 509 via a wired or wireless transmission medium and can be installed on the recording unit 508. Further, the program can be installed in advance in the ROM 502 or the recording unit 508.

The program executed by the computer may be a program processed chronologically in an order described in this specification or may be a program processed in parallel or at a necessary timing such as a called time.

Embodiments of the present technology are not limited to the above-described embodiments, but may be modified in various ways within the scope of the present technology without departing from the gist of the present technology.

For example, an embodiment of the present technology may be realized by a cloud computing configuration in which one function is distributed and processed collectively by a plurality of devices via a network.

The respective steps described in the above-described flowcharts may be performed by one device and may be also distributed and performed by a plurality of devices.

When a plurality of processes are included in one step, the plurality of processes included in the one step may be performed by one device or may be distributed and performed by a plurality of devices.

Further, embodiments of the present technology may be realized as follows.

(1) An information processing system including: circuitry configured to acquire first image data captured by a first camera unit disposed on a first side of a housing; acquire second image data captured by a second camera unit disposed on a second side of the housing, which is opposite to the first side of the housing; and modify the second image data based on the first image data.

(2) The information processing system of (1), wherein the first image data is captured by the first camera unit at substantially the same time as the second image data is captured by the second camera unit.

(3) The information processing system of any of (1) to (2), wherein the circuitry is configured to modify the second image data by performing blur correction on the second image data based on the first image data.

(4) The information processing system of any of (1) to (3), wherein the circuitry is configured to: generate first motion information based on the first image data; generate second motion information based on the second image data; and modify the second image data by performing blur correction on the second image data based on the first motion information and the second motion information.

(5) The information processing system of (4), wherein the first motion information is a first motion vector corresponding to the first image data, and the second motion information is a second motion vector corresponding to the second image data.

(6) The information processing system of (5), wherein the circuitry is configured to: generate a third motion vector by synthesizing the first motion vector and the second motion vector; and modify the second image data by performing blur correction on the second image data based on the third motion vector.

(7) The information processing system of claim 1, wherein the circuitry is configured to: generate first motion information corresponding to motion of the information processing apparatus based on the first image data; generate second motion information corresponding to the motion of the information processing apparatus based on the second image data; generate third motion information corresponding to the motion of the information processing apparatus based on the first motion information and the second motion information; modify the second image data by performing blur correction on the second image data based on the third motion information.

(8) The information processing system of any of (1) to (7), wherein the circuitry is configured to modify the second image data by controlling an image capture angle corresponding to the second image data based on the first image data.

(9) The information processing system of (8), wherein the circuitry is configured to control the image capture angle corresponding to the second image data by at least one of changing a zoom ratio of the second camera unit, changing a diaphragm of the second camera unit, changing an orientation of the second camera unit, and performing image deformation of the second image data.

(10) The information processing system of any of (8) to (9), wherein the circuitry is configured to: calculate a viewpoint of a user based on the first image data; and control the image capture angle corresponding to the second image data based on the calculated viewpoint of the user.

(11) The information processing system of (10), wherein the circuitry is configured to calculate the viewpoint of a user by obtaining a sight line direction of the user in relation to a display included in the information processing system.

(12) The information processing system of any of (1) to (11), wherein the circuitry is configured to: output the second image data to a display; detect a gaze position of a user on the display based on the first image data; and modify the second image data by controlling an image capture parameter of the second camera unit based on the detected gaze position of the user on the display.

(13) The information processing system of (12), wherein a plurality of objects are included in the second image data; and the circuitry is configured to determine which of the plurality of objects displayed on the display corresponds to the detected gaze position of the user; and control the image capture parameter corresponding to the second image data based on the determining.

(14) The information processing system of any of (1) to (13), wherein the circuitry is configured modify the second image data by synthesizing the first image data and the second image data.

(15) The information processing system of any of (1) to (14), wherein the circuitry is configured to: obtain a first white balance value corresponding to the first image data; obtain a second white balance value corresponding to the second image data; and control a light source to emit light based on the first white balance value and the second white balance value.

(16) The information processing system of (15), wherein the circuitry is configured to: acquire third image data captured by the first camera unit while the light source is emitting light; and modify the second image data by synthesizing the third image data and the second image data.

(17) The system of any of (1) to (16), wherein the system is a mobile phone including the housing and the circuitry.

(18) The system of any of (1) to (17), wherein the system comprises: a server including the circuitry and an interface configured to receive the first and second image data from a device connected to the server via a network.

(19) An information processing method including: acquiring first image data captured by a first camera unit disposed on a first side of a housing; acquiring second image data captured by a second camera unit disposed on a second side of the housing, which is opposite to the first side of the housing; and modifying the second image data based on the first image data.

(20) A non-transitory computer-readable medium including computer-program instructions, which when executed by an information processing system, cause the system to: acquire first image data captured by a first camera unit disposed on a first side of a housing; acquire second image data captured by a second camera unit disposed on a second side of the housing, which is opposite to the first side of the housing; and modify the second image data based on the first image data.

(21) An image processing device includes: a first imaging unit that performs photographing in a first direction; a second imaging unit that performs photographing in a second direction different from the first direction; and a control information generation unit that generates control information for adjustment of a second image obtained through the photographing by the second imaging unit based on information obtained from a first image obtained through the photographing by the first imaging unit.

(22) In the image processing device described in (21), the control information generation unit may generate motion information indicating a motion of the image processing device as the control information based on motion information obtained from the first image. The image processing device may further include a correction unit that corrects motion shake of the second image caused by the image processing device based on the control information.

(23) In the image processing device described in (21) or (22), the control information generation unit may generate the control information by synthesizing the motion information obtained from the first image and motion information obtained from the second image.

(24) In the image processing device described in any of (21) through (23), the first imaging unit may be provided on a surface of a user side on which the image processing device is operated. The control information generation unit may generate the control information for changing a field angle of the second image based on a viewpoint position of the user obtained from the first image.

(25) In the image processing device described in any of (21) through (24), the control information generation unit may adjust the field angle of the second image by controlling the second imaging unit based on the control information.

(26) In the image processing device described in any of (21) through (25), the control information generation unit may perform field angle adjustment by changing a zoom magnification or a diaphragm of the second imaging unit or inclining the second imaging unit.

(27) The image processing device described in any of (21) through (26) may further include an image deformation unit that adjusts the field angle of the second image by performing image deformation on the second image based on the viewpoint position.

(28) In the image processing device described in any of (21) through (27), the first imaging unit may be provided on a surface of a user side on which the image processing device is operated. The control information generation unit may generate the control information for performing focal point adjustment of the second imaging unit, lightness adjustment of the second image, or white balance adjustment of the second image based on a sight line direction of the user obtained from the first image.

(29) The image processing device described in any of (21) through (28) may further include a display unit that is provided on a surface of a side of the second imaging unit. The control information generation unit may generate the control information for radiating a subject of the second image with light by causing the display unit to emit the light based on a white balance value of the first image and a white balance value of the second image.

(30) The image processing device described in any of (21) through (29) may further include a synthesis unit that synthesizes the first image and the second image photographed when the display unit emits the light based on the control information.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

11 Image processing device
21 Display unit
22 In-image capturing unit
23 Out-image capturing unit
53 Signal processing unit
81 Motion estimation unit
82 Motion estimation unit
84 Camera blur correction unit
141 Position calculation unit
142 Field angle transformation processing unit
211 White balance calculation unit
212 White balance calculation unit
213 Light source color calculation unit
214 Synthesis unit

The invention claimed is:

1. An information processing system comprising:
a controller configured to generate an instruction to initiate blur correction; and
circuitry configured to
receive the instruction to initiate the blur correction,
acquire first image data captured by a first camera unit disposed on a first side of a housing;
acquire second image data captured by a second camera unit disposed on a second side of the housing, which is opposite to the first side of the housing;
generate first motion information based on the first image data;
generate second motion information based on the second image data; and
modify the second image data based on the first image data by performing the blur correction on the second image data based on the first motion information and the second motion information.

2. The information processing system of claim 1, wherein the first image data is captured by the first camera unit at substantially the same time as the second image data is captured by the second camera unit.

3. The information processing system of claim 1, wherein the first motion information is a first motion vector corresponding to the first image data, and
the second motion information is a second motion vector corresponding to the second image data.

4. The information processing system of claim 3, wherein the circuitry is further configured to:
generate a third motion vector by synthesizing the first motion vector and the second motion vector, and
modify the second image data by performing the blur correction on the second image data based on the third motion vector.

5. The information processing system of claim 1, wherein the first motion information corresponds to motion of an information processing apparatus,
the second motion information corresponds to the motion of the information processing apparatus, and
the circuitry is further configured to
generate third motion information corresponding to the motion of the information processing apparatus based on the first motion information and the second motion information, and
modify the second image data by performing the blur correction on the second image data based on the third motion information.

6. The information processing system of claim 1, wherein the circuitry is configured to modify the second image data by controlling an image capture angle corresponding to the second image data based on the first image data.

7. The information processing system of claim 6, wherein the circuitry is configured to control the image capture angle corresponding to the second image data by at least one of changing a zoom ratio of the second camera unit, changing a diaphragm of the second camera unit, changing an orientation of the second camera unit, or performing image deformation of the second image data.

8. The information processing system of claim 6, wherein the circuitry is configured to:
calculate a viewpoint of a user based on the first image data, and
control the image capture angle corresponding to the second image data based on the viewpoint of the user that is calculated.

9. The information processing system of claim 8, wherein the circuitry is configured to calculate the viewpoint of the user by obtaining a sight line direction of the user in relation to a display included in the information processing system.

10. The information processing system of claim 1, wherein the circuitry is further configured to:
output the second image data to a display,
detect a gaze position of a user on the display based on the first image data, and
modify the second image data by controlling an image capture parameter of the second camera unit based on the gaze position of the user on the display that is detected.

11. The information processing system of claim 10, wherein a plurality of objects are included in the second image data, and wherein the circuitry is further configured to
   determine which of the plurality of objects displayed on the display corresponds to the gaze position of the user that is detected, and
   control the image capture parameter corresponding to the second image data based on the determining.

12. The information processing system of claim 1, wherein
   the circuitry is further configured to modify the second image data by synthesizing the first image data and the second image data.

13. The information processing system of claim 1, wherein the circuitry is further configured to:
   obtain a first white balance value corresponding to the first image data,
   obtain a second white balance value corresponding to the second image data, and
   control a light source to emit light based on the first white balance value and the second white balance value.

14. The information processing system of claim 13, wherein the circuitry is further configured to:
   acquire third image data captured by the first camera unit while the light source is emitting light, and
   modify the second image data by synthesizing the third image data and the second image data.

15. The information processing system of claim 1, wherein
   the information processing system is a mobile phone including the housing and the circuitry.

16. The information processing system of claim 1, wherein the information processing system comprises:
   a network;
   a device connected to the network; and
   a server connected to the network, the server including
      the controller;
      the circuitry; and
      an interface configured to receive the first image data and the second image data from the device connected to the server via the network.

17. An information processing method comprising:
   acquiring first image data captured by a first camera unit disposed on a first side of a housing;
   acquiring second image data captured by a second camera unit disposed on a second side of the housing, which is opposite to the first side of the housing;
   generating first motion information based on the first image data;
   generating second motion information based on the second image data; and
   modifying the second image data based on the first image data by performing blur correction on the second image data based on the first motion information and the second motion information.

18. A non-transitory computer-readable medium including computer-program instructions, which when executed by an information processing system, cause the information processing system to:
   acquire first image data captured by a first camera unit disposed on a first side of a housing;
   acquire second image data captured by a second camera unit disposed on a second side of the housing, which is opposite to the first side of the housing; and
   generating first motion information based on the first image data;
   generating second motion information based on the second image data; and
   modify the second image data based on the first image data by performing blur correction on the second image data based on the first motion information and the second motion information.

19. The information processing method of claim 17, wherein
   the first motion information is a first motion vector corresponding to the first image data, and
   the second motion information is a second motion vector corresponding to the second image data.

20. The non-transitory computer-readable medium of claim 19, wherein
   the first motion information is a first motion vector corresponding to the first image data, and
   the second motion information is a second motion vector corresponding to the second image data.

21. An information processing system comprising:
   memory; and
   an electronic processor configured to
      acquire first image data captured by a first camera unit disposed on a first side of a housing;
      acquire second image data captured by a second camera unit disposed on a second side of the housing, which is opposite to the first side of the housing;
      generate first motion information based on the first image data;
      generate second motion information based on the second image data; and
      modify the second image data based on the first image data by performing blur correction on the second image data based on the first motion information and the second motion information.

* * * * *